(12) United States Patent
Zürcher

(10) Patent No.: US 6,325,204 B1
(45) Date of Patent: Dec. 4, 2001

(54) METHOD AND DRIVE APPARATUS FOR CONTINUOUSLY CASTING METAL IN A CONTINUOUS BLOCK CASTER

(75) Inventor: Ernst Zürcher, Frutigen (CH)

(73) Assignee: Nichols Aluminum-Golden, Inc., Houston, TX (US)

( * ) Notice: Subject to any disclaimer, the term of this patent is extended or adjusted under 35 U.S.C. 154(b) by 0 days.

(21) Appl. No.: 09/226,841

(22) Filed: Jan. 7, 1999

Related U.S. Application Data

(60) Continuation-in-part of application No. 08/889,023, filed on Jul. 7, 1997, which is a division of application No. 08/221,172, filed on Mar. 30, 1994, now Pat. No. 5,645,159.

(51) Int. Cl.[7] .................................................. B65G 23/00
(52) U.S. Cl. ........................................... 198/792; 198/832
(58) Field of Search .................... 198/792, 832, 198/626.1, 838

(56) References Cited

U.S. PATENT DOCUMENTS

| | | | |
|---|---|---|---|
| 1,621,205 | 3/1927 | Jones et al. ............................ | 198/850 |
| 1,841,297 | 1/1932 | Perry . | |
| 2,763,361 | 9/1956 | Foster ................................... | 198/838 |
| 2,904,860 | 9/1959 | Hazelett ................................ | 22/57.4 |
| 3,002,604 | 10/1961 | Brems ................................... | 198/838 |
| 3,155,227 | 11/1964 | Wesson ................................. | 198/838 |
| 3,314,526 | 4/1967 | Franek .................................. | 198/137 |
| 3,493,097 | 2/1970 | Karr ...................................... | 198/181 |
| 3,570,586 | 3/1971 | Lauener ................................ | 164/279 |
| 3,747,535 | 7/1973 | Zuppiger ............................... | 104/25 |
| 3,747,666 | 7/1973 | Gyongyos ............................. | 164/279 |
| 3,835,917 | 9/1974 | Gyongyos ............................. | 164/279 |
| 3,903,806 | * 9/1975 | Ayres et al. .......................... | 198/792 |
| 4,013,163 | 3/1977 | Gaal ..................................... | 198/575 |
| 4,331,195 | 5/1982 | Webber ................................ | 164/431 |
| 4,349,101 | 9/1982 | Eldred .................................. | 198/851 |
| 4,351,637 | 9/1982 | Dixon ................................... | 198/838 |
| 4,432,450 | 2/1984 | Dorigo .................................. | 198/832 |
| 4,509,429 | * 4/1985 | de Broqueville .................... | 198/792 |
| 4,794,978 | 1/1989 | Lauener ................................ | 164/431 |
| 4,825,999 | 5/1989 | Hammer ............................... | 198/834 |
| 4,895,202 | 1/1990 | Sato et al. ............................ | 164/430 |
| 5,119,925 | 6/1992 | Nomura ................................ | 198/814 |
| 5,133,401 | 7/1992 | Cisko et al. .......................... | 164/430 |
| 5,164,777 | 11/1992 | Agarwal ............................... | 355/212 |
| 5,168,980 | 12/1992 | Mitsumoto ........................... | 198/833 |
| 5,217,103 | 6/1993 | Umlauf ................................. | 198/838 |
| 5,400,898 | 3/1995 | Weber .................................. | 198/792 |
| 5,645,122 | 7/1997 | Luginbühl ............................ | 164/479 |
| 5,697,423 | 12/1997 | Roder et al. ......................... | 164/414 |
| 5,839,500 | 11/1998 | Roder et al. ......................... | 164/414 |

FOREIGN PATENT DOCUMENTS 61-82954  4/1986  (JP) ............................... B22D/11/06

* cited by examiner

*Primary Examiner*—Joseph E. Valenza
(74) *Attorney, Agent, or Firm*—Sheridan Ross P.C.

(57) ABSTRACT

A method and novel drive system for use in a continuous block caster for continuously casting metal is disclosed. In particular, a novel worm gear drive system which reduces imperfections that can be created in a cast by movement of a beam chain through a casting cycle is disclosed.

69 Claims, 14 Drawing Sheets

METHOD AND DRIVE APPARATUS FOR CONTINUOUSLY CASTING METAL IN A CONTINUOUS BLOCK CASTER

CROSS-REFERENCE TO RELATED APPLICATIONS

This application is a continuation-in-part of U.S. application Ser. No. 08/889,023, now abandoned, entitled "Worm Gear Drive for Continuous Block Caster", filed Jul. 7, 1997, which is a divisional application of U.S. application Ser. No. 08/221,172, entitled "Method and Apparatus for Continuously Casting Metal", filed Mar. 30, 1994, now U.S. Pat. No. 5,645,159, issued on Jul. 8, 1997. The entire disclosures of U.S. application Ser. No. 08/221,172 and U.S. Pat. No. 5,645,159 are incorporated herein by reference in their entirety.

FIELD OF THE INVENTION

The present invention relates to a method and apparatus for continuously casting metal. In particular, the present invention relates to an improved drive system in a block caster.

BACKGROUND OF THE INVENTION

There are a number of known methods and apparatus for continuously casting metal into strips, sheets and slabs. The term "metal" as used herein, refers to any type of castable metal, including, but not limited to, aluminum, steel, iron, copper, zinc, nickel, titanium, magnesium, manganese and their alloys. In a typical continuous casting process, molten metal is supplied from a tundish to a system of rollers, belts or chains which define a continuously moving mold. Block casters are particularly useful in continuously casting metal because they can provide a wide range of solidification rates, which allows a wide range of control over the physical properties of the metal being cast. Block casters are described, for example in U.S. Pat. No. 5,697,423 to Roder et al., U.S. Pat. No. 5,645,159 to Luginbuhl et al. and U.S. Pat. No. 5,645,122 to Luginbuhl et al., each of which is incorporated herein by reference in its entirety.

A typical block caster includes two synchronized, counter-rotating chains containing chilling blocks which travel through casting loops. The casting loops are disposed in close relation to one another such that the counter-rotating chains can be forced together to define a flat plane, continuously moving mold assembly for receiving molten metal. As the molten metal is poured from a tundish and contacts the surfaces of the mold, heat transfer between the molten metal and the mold surfaces causes the molten metal to solidify.

The counter-rotating beam chains in a block caster travel in a track which defines the shape of the casting loops. Typically, the casting loops are oval in shape, containing two substantially linear sections and two non-linear bends, however, other shapes have been employed. Generally, in one linear section of the casting loop, the chilling blocks are cooled and in the other linear section the chilling blocks define a casting region. The chain can be driven around the track through the use of a drive system, which typically is a system of gears or sprockets in mesh with the chain.

In known block casters, the chain is comprised of a number of chilling blocks, which are affixed to support beams. The chilling blocks define the continuously moving mold and are in direct contact with the molten metal. The support beams are typically used to interlink the chilling blocks together to form an endless "beam" chain and can contain features for meshing with the track and drive systems. The chilling blocks themselves are typically not interlinked or in mesh with the track and drive systems because the chilling blocks experience thermal and physical deformations during casting which could adversely affect the operation of the caster. Thus, it is desirable that the chilling blocks be at least partially thermally isolated from the support beams. For example, U.S. Pat. No. 3,570,586 by Lauener, assigned to Lauener Engineering Ltd., generally describes a block caster with chilling blocks thermally isolated from support beams, which travel through a casting loop along a guideway.

It is desirable in a continuous block caster to provide a substantially smooth, planar mold surface for casting metal sheets, strips or slabs. The amount by which of the mold surface approximates a smooth plane can have a direct impact on the surface quality and the microstructure of the cast. For example, changes in block height or block surface angle can create surface imperfections in the cast or can create insulating gas pockets between the block surface and the molten metal affecting the solidification rate of the metal and thus the microstructure of the cast.

U.S. Pat. No. 5,133,401 by Cisko et al., assigned to the Aluminum Company of America, discloses a block casting apparatus purportedly for solving the problem of poor surface accuracy of a cast slab. The disclosed apparatus utilizes a chilling block and support beam structure. The support beams contain inboard and outboard or "offset" rollers for carrying the beam chain along horizontal upper and lower guide tracks. The support beams are interconnected using elastic hinges to form an endless beam chain. The beam chain is driven around the guide tracks using an opposed-torque gearing system in mesh with gear racks which are located on the bottom surfaces of the support beams.

Known casting systems, however, such as that disclosed in by Cisko et al., allow individual chilling blocks to tilt around an axis (the "y-axis") transverse to the casting direction, negatively impacting the amount the mold surface approximates a smooth plane. The meshing of the gear rack system disclosed by Cisko et al. can be dependent upon manufacturing tolerances. Moreover, the offset roller system requires precise manufacturing tolerances of the rollers and the guide track to prevent binding or excess movement of the rollers in the track.

It is also generally desirable that a block caster contain features which accommodate the differences in track length and beam chain length. Differences in beam chain length and track length can occur when fitting beams in a chain and also during casting as a result of thermal effects upon the beam chain or the track. If these differences are not compensated-for, the blocks can move relative to one another in the casting region, reducing the quality of the cast through "banging," i.e., unnecessary contact between adjacent blocks, or by allowing molten metal to seep between chilling blocks causing damage to the caster and the chilling blocks. Damage to the caster and the chilling blocks causes lost production due to down-time required to repair the caster and/or to replace damaged chilling blocks.

In known block casters, such as that described in the '401 patent by Cisko, et al., elastic hinges have been used for interlinking the support beams to accommodate differences in beam chain and guide track lengths. The use of elastic hinges in the beam chain and an opposed-torque gear drive system, however, can cause problems in meshing the gear drive system with the gear racks on the support beams.

Elastic hinge systems are designed to allow adjacent blocks to exert pressure upon one another in the casting region to prevent gaps between chilling blocks from forming. The use of an elastic beam chain alone, however does not compensate for reductions in the quality of the cast due to banging between blocks.

It is further desirable that a block caster be designed to substantially reduce imperfections in the cast and damage caused to chilling blocks caused by mechanical forces such as vibrations and the like propagated by blocks traveling along a track. Moreover, it is desirable to substantially reduce any additional forces or effects created by blocks traveling through a casting cycle which can negatively impact the quality of the cast.

The '401 patent by Cisko et al., previously described herein, also discloses the use of tracks which are asymmetrical about a plane parallel to a lateral plane through the mold cavity. Cisko et al. disclose that each bend in their elongated oval track consists of two smoothly joined quadrants each having a different radius and center, and that typically no two of the four radii of the four quadrants are the same.

The asymmetrical track design disclosed in the '401 patent by Cisko et al. purportedly minimized the "mechanical noise" generated by the "mechanical excitation" of the chilling blocks banging against each other in the bends of the track as can occur when using an elastic beam chain. The asymmetrical tracks are an attempt to reduce the net effects of mechanical excitation in the bends by maintaining the inputs from positive and negative block acceleration out of phase. The asymmetrical track design for dampening mechanical excitation described by Cisko et al., however, does not substantially compensate for other forces or effects which can negatively impact the quality of the cast which are propagated by chilling blocks traveling through a casting cycle.

SUMMARY OF THE INVENTION

In accordance with the present invention, methods and apparatus are provided for use in continuously casting metal sheets, strips or slabs in a block caster which provide for a substantially planar mold surface. The present invention provides apparatus and method for substantially reducing undesirable forces and/or effects propagated by the beam chain traveling through a casting cycle which negatively impact the quality of the cast. Additionally, the present invention provides apparatus and method for substantially reducing errors caused by wear, manufacturing errors, thermal deformations and low manufacturing tolerances (e.g., whereby tolerances allow for very little margain of error) during meshing of beams.

In accordance with the present invention, caster drives are provided which include, for example, the use of worm gears and synchronization systems for moving beam chains along the caster tracks.

In one embodiment, the present invention provides a novel worm gear which compensates for variations in beam pitch during operation of a caster. Such a worm gear can include a section which compensates for beam pitches that are greater than one theoretical beam pitch and/or a section that compensates for beam pitches that are less than one theoretical beam pitch. In one embodiment, such a worm gear includes a cylindrical shaft having helical channels along the length of the shaft thereby forming a thread. The helical channels are capable of receiving a device for meshing the beam chain with the worm gear when the device for meshing reaches an inlet section of the worm gear and axially pushing the device for meshing through a constant section of the worm gear toward an outlet section of the worm gear. The thread pitch of the inlet section initially is about one theoretical beam pitch plus a first correction factor, the thread pitch gradually decreasing at a substantially constant rate to about one theoretical beam pitch over a first longitudinal distance. The thread pitch of the constant section initially is about one theoretical beam pitch, the thread pitch remaining substantially constant over a second longitudinal distance. The thread pitch of the outlet section initially is about one theoretical beam pitch, the thread pitch gradually decreasing at a substantially constant rate to about one theoretical beam pitch minus a second correction factor over a third longitudinal distance. In further embodiments, the first and/or second correction factor can be from about 0.1 mm to about 0.5 mm, and preferably from about 0.2 mm to about 0.4 mm, and more preferably, about 0.3 mm. The first longitudinal distance, in one embodiment, is one theoretical beam pitch plus the correction factor. The second longitudinal distance, in one embodiment, is from about 1 to about 1.5 theoretical beam pitches, with about 1.25 theoretical beam pitches being more preferred. The third longitudinal distance, in one embodiment, is one theoretical beam pitch minus the correction factor.

Another embodiment of the present invention relates to a method for compensating for variation in individual beam pitch in a beam chain of a continuous block caster, the method including providing a worm gear having a first section which compensates for beams which are longer than one theoretical beam pitch; a second section having a constant pitch; and, a third section which compensates for beams which are shorter than one theoretical beam pitch.

Another embodiment of the present invention relates to a method for compensating for variation in individual beam pitch in a beam chain of a continuous block caster. The method includes the steps of contacting a device for meshing a beam chain with a worm gear which includes a cylindrical shaft having helical channels along the length of the shaft that form a thread having a thread face. The thread has varying pitch to compensate for at least one variation in beam pitch, including: (a) beam pitches longer than one theoretical beam pitch; and (b) beam pitches shorter than one theoretical beam pitch.

DETAILED DESCRIPTION

Figure 1:
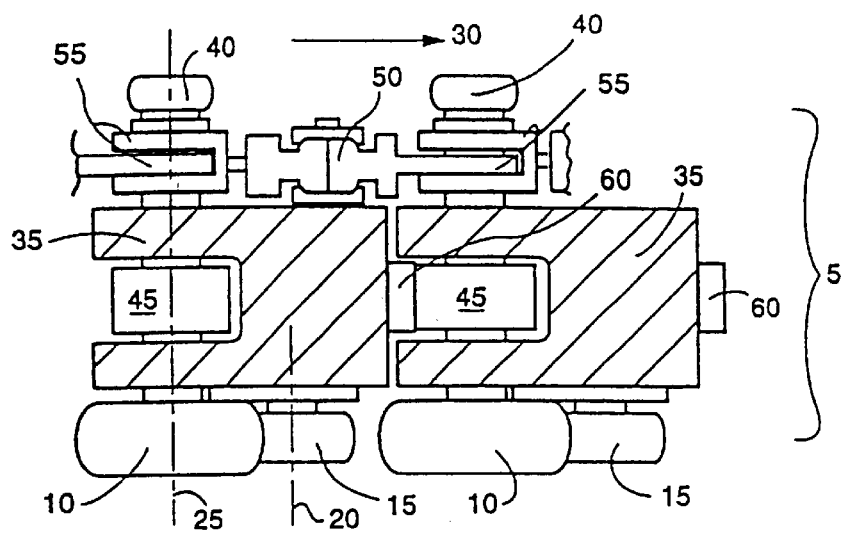
FIG. 1 illustrates one embodiment of the tensioning unit of the present invention and one embodiment of the roll support of the present invention viewed in a direction normal (the "z-direction") to the casting surface of a block.

The quality of a cast can be limited by the imperfections created in the cast by the casting process. The quality of the exterior surface of a cast can be enhanced by, for example, increasing the flatness of the mold surface so that it approximates a smooth plane, maintaining substantially constant speed of the beam chain in the casting cycle, substantially synchronizing the two counter-rotating beam chains, and reducing undesirable forces propagated by the blocks and beam chain as they travel through the casting cycle. The present invention relates to novel methods and apparatus for continuously casting molten metal in a block caster which provide for enhanced cast quality through the use of improved track and drive systems.

The apparatus and method of the present invention particularly provide enhanced cast quality by providing an improved drive system which reduces errors caused by, for example, wear, manufacturing errors, thermal deformations and low manufacturing tolerances during meshing of the beam and, in one embodiment, compensates for variation in individual beam pitch.

The apparatus of the present invention provides enhanced cast quality by providing a substantially planar mold surface for solidifying the molten metal. In particular, the present invention provides apparatus which reduce the tilting of blocks in a beam chain along an axis (the "y-axis") transverse to the casting direction as the blocks travel through a casting cycle. A reduction in block tilting can be achieved through the use of the novel beam chains, roll supports, drive meshing systems and track designs of the present invention.

In one embodiment of the present invention, the track and drive systems of the block caster utilize an endless, prestressed beam chain having fixed pitches. As used herein, the term "pitch" refers to the distance between successive elements arranged similarly between two points on a surface or part. Therefore, use of the term "pitch" with reference to a beam (i.e., "beam pitch") refers to the length of the segments of the beam chain between pivot points in the beam chain, i.e., the points where support beams in the beam chain are pivotally interlinked. According to the present invention, "beam pitch" refers to the actual beam pitch, which is the actual, measured beam pitch of any given segment (i.e., beam) in the beam chain at a point in time. Similarly, the term "thread pitch" refers to the length between the threads of a screw, such as in a worm gear drive system of the present invention. An "individual beam pitch" is the beam pitch of a single segment of a beam chain at a point in time. The term "theoretical beam pitch" refers to the theoretical, mathematically calculated beam pitch of the beam chain, which theoretically, would remain constant from segment to segment. In reality, the beam pitch changes due to thermal and/or mechanical deformations in the segments of the beam chain, for which the novel drive system of the present invention compensates.

The pre-stressed beam chain can also include chilling blocks mounted to the interconnected support beams. The term "block" as used herein, refers to a chilling block itself or a chilling block which has been attached to one or more block holding plates. For stressing the beam chain, the support beams can be interlinked using a tensioning unit, including for example, hydraulic or pneumatic cylinders, bands or springs.

One advantage of pre-stressing the beam chain in the present invention is to prevent the individual blocks from separating from one another as they travel through the casting region. Separation of blocks in the casting region allows the blocks space in which to tilt and can allow molten metal to seep between chilling blocks, causing damage to the caster or the beam chain. In general, the pre-stressed beam chains of the present invention will only allow separation of the blocks and beams to occur during casting as a safety feature in an emergency situation. The differences in beam chain length and track length such as can occur during casting can be accommodated by changing the track length rather than the length of the pre-stressed beam chain. Also, the pre-stressed beam chains of the present invention do not, in general, rely upon the caster drive system to compress the blocks in the casting region to eliminate gaps between adjacent blocks.

In one embodiment of the present invention, the tensioning unit which interlinks the support beams in a beam chain can be a spring-loaded device comprising a spring, such as a plate or coiled spring, disposed around a bolt connecting two adjacent support beams. For example, a bolt having a spring coiled around its length can be pivotally attached on one end to a support beam, and a sheath covering the bolt and spring can be pivotally attached on one end to an adjacent support beam. The bolt and sheath device can be designed to allow the bolt to slide freely in and out of the sheath, while maintaining position of the spring around the bolt in a compartment formed by the bolt and the inner surface of the sheath. The spring can be contained on the free end of the bolt by a nut or the like. The spring can be retained within the sheath through which the bolt can slide by a lip on the free end of the sheath which forms an aperture only large enough to allow passage of the bolt. Thus, the spring is confined within a compartment defined by the bolt and the outer sheath. The spring can provide connective force between the adjacent support beams to which the bolt and sheath are attached, which can be adjusted by adjusting the positioning of the nut on the free end of the bolt to compress the spring, causing the fixed ends of the bolt and the sheath to be drawn together. This in turn causes adjacent support beams to be compressed together. In another embodiment, the sheath can be a two-piece member having raised ends which mate together, such that when the two ends are closed against one another, such as by the use of a nut or the like, the spring can be compressed, increasing the connective force between adjacent support beams. When a number of support beams are linked together to form an endless beam chain and the tensioning units are adjusted to compress adjacent support beams together, the chain is "prestressed."

Although the support beams in the pre-stressed beam chain are compressed against one another, typically, the blocks mounted upon such support beams do not contact one another prior to experiencing thermal loading during casting, i.e., when the blocks are cold. Even after thermal loading, adjacent blocks can remain separated from one another by a small gap which will not be sufficiently large to allow molten metal to seep between the blocks. Even if the blocks make contact with one another after thermal loading, the adjacent blocks typically exert little to no force upon one another. The force required by the tensioning units to prevent adjacent beams from separating from one another, i.e., maintaining fixed pitch, during casting varies depending upon, for example, caster operational temperatures and support beam and block geometries and masses.

The support beams which are interlinked to form the pre-stressed beam chain should also contain features such as rollers or the like for transporting the individual blocks in the chain around a continuous track. As used herein, the term "casting cycle" refers to the completion of a single revolution of the continuous track by the beam chain. In the apparatus of the present invention, the transport system employed is a roll support, wherein rollers mounted on a supporting member extending from a support beam flange travel along a continuous track. It is desirable that the roll support design substantially prevents binding of the rollers as the rollers negotiate bends in the track. In addition, it is preferable that the roll support be designed to substantially minimize block tilting.

The roll supports of the present invention can include, for example a main roller and a counter-roller mounted on a supporting member extending from a support beam flange. Such roll supports minimize the distance between the axis of the load bearing roller (the main roller) and the casting surface of the chilling block, reducing the tendency of the block to pivot along the roller axis as it is driven along the track, thereby reducing block tilting. In addition, in the roll supports of the present invention, the axes of the main, load bearing roller and the counter-roller can also be offset in the casting direction (the "x-direction") to further reduce pivoting of the block along the main roller axis.

In one embodiment of the roll support of the present invention, a main, load bearing roller, and a compressible counter-roller can be mounted on supporting member extending from a support beam flange. At the junction of the supporting member and the support beam flange, an apparatus, such as a wedge or similar device for adjusting the beam height, beam surface angle and beam pitch can be inserted. The rollers of the roll support can be arranged to compress and travel along a track for transporting the beam chain. The main roller can be fixed in position on an axle extending from the supporting member. The counter-roller can be mounted on one end of a lever-like member pivotally mounted to the supporting member. The other end of the lever-like member can be in contact with the supporting member using a compression device, such as a spring or the like for applying force to the lever to compress the counter-roller to the track surface. The roll support can also include a guide roller or the like for preventing movement of the individual blocks in a direction transverse to the casting direction (the "y-direction") as the block travels along the track.

In an embodiment of a roll support, the main roller travels on an "upper" track surface and the counter-roller travels on a track surface opposed to the upper track surface. The counter-roller can be compressed to the opposed track surface, by the force exerted by a spring or the like on the one end of the lever-like member, also causing compression of the main roller with the upper track surface. The main roller can also be compressed to the upper track surface by the weight of the support beam and block assembly.

The compressive forces exerted by the rollers on the track serve to pinch the rollers to the track and maintain the contact of the rollers with the track while the chain travels along the track through the casting cycle. The force applied by the compression unit which can be required for maintaining the main and opposed rollers in contact with the track system varies, for example, with the block and support beam masses. The compression unit should provide enough force to keep the rollers in contact with the track surfaces during the entire casting cycle.

The endless track upon which the beam chain travels typically will contain two or more bends and two or more substantially linear sections when viewed from the y-direction. In particular, the track can have an elongated, substantially oval shape in profile when viewed from the y-direction. In order to accommodate the roll support of the present invention, the track system of the present invention can contain an upper track surface and an opposed track surface. In those embodiments where a guide roller is used to prevent movement of the blocks in the y-direction, an outer guideway can also be used. The tracks of the present invention are simple in design and can be manufactured to relatively low tolerances without substantially affecting cast quality. Moreover, when using the roll support and track of the present invention, the roll support is generally incapable of pinching or binding as it travels along the track, even after the track and roll support undergo substantial thermal expansion or deformation.

In order to drive the pre-stressed beam chain along the track and through a casting cycle, the beam chain can also contain features for meshing with the drive system. More particularly, as examples of embodiments of a device for meshing with the drive system, the support beams in a beam chain can contain pivot rollers, pins, cogs, gear racks or any other apparatus suitable for meshing the beam chain with the drive system, mounted on the support beam flanges. It is desirable to employ a drive meshing system which can reduce lever-like action of the block as it pivots on the roll support while being engaged by the drive system. It is further desirable to utilize a meshing system which is not overly sensitive to manufacturing tolerances or thermal deformation of the roll support and support beam during casting.

In one embodiment, the present invention utilizes at least one pivot roller mounted to individual support beams for meshing individual beams in a beam chain to the drive system. Preferably, a pivot roller can be aligned on an axis common with the main roller of the roll support to reduce pivoting of the block while the beam chain is engaged by the drive system.

The apparatus which comprise the track systems of the present invention, including, the pre-stressed beam chain, the roll support, the drive system meshing and the track, can be more readily understood by reference to FIGS. 1 through 4. FIG. 1 illustrates one embodiment of the tensioning unit and one embodiment of the roll support of the present invention as viewed along an axis (the "z-axis") normal to the casting direction. In FIG. 1, looking down through a support beam flange (cut away), two roll supports 5, including main rollers 10, and counter rollers 15 having an axes 20 offset from the axis 25 of the main roller 10 in the x-direction 30, are attached to supporting members 35 extending from a support beam flange (200 in FIG. 3). At the junction of the supporting member and the support beam flange, an apparatus, such as a wedge or similar device for adjusting the beam height, beam surface angle and beam pitch can be inserted (not shown). The roll supports 5 also contain pivot rollers 40 and needle bearings 45, which are aligned on the same axis 25 as the main rollers 10. A tensioning unit 50 is attached to the roll supports 5 near the bases of the pivot rollers 40, using pivoting attachments 55. Roll supports 5 also contain nose members 60, which mate with the needle bearings of an adjacent roll support after the two support beams are interconnected.

Figure 2:
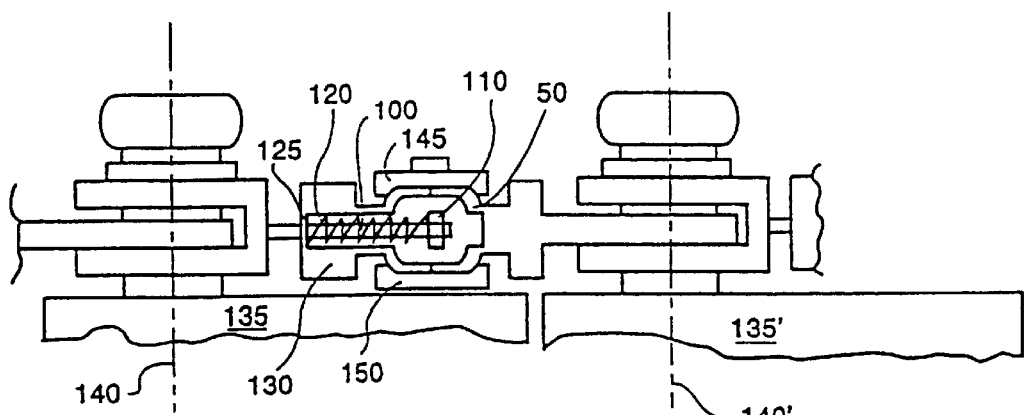
FIG. 2 illustrates another, close-up view of the embodiment of the tensioning unit of the present invention shown in FIG. 1.

FIG. 2 illustrates a cut-away, close-up view of the embodiment of the tensioning unit of the present invention shown in FIG. 1. In FIG. 2, once again looking down through a support beam flange (200 in FIG. 3), the interior of a tension unit 50 is shown, which includes a bolt 100 having a lip 110 attached at one end and a spring 120 disposed around bolt 100 which is contained on its one end by the lip 110 on bolt 100 and on its other end by a lip 125 on sheath 130. Bolt 100 can be pivotally connected to supporting member 135 of a roll support and sheath 130 can be pivotally connected to an adjacent supporting member 135'of an adjacent roll support. The tension of spring 120 can be increased or decreased, e.g., by adjusting the position of lip 110 along the longitudinal axis of bolt 100. Lip 110 can be a nut which has been screwed onto bolt 100 for changing the tension in spring 120. The tension in the spring 120 can also be controlled by nut 145 and backing nut 150. By screwing down nut 145, the two parts of sheath 130 can be joined together forcefully to further compress spring 120, causing sheath 130 to slide along bolt 100, and forcefully connecting the two adjacent roll supports.

Figure 3:
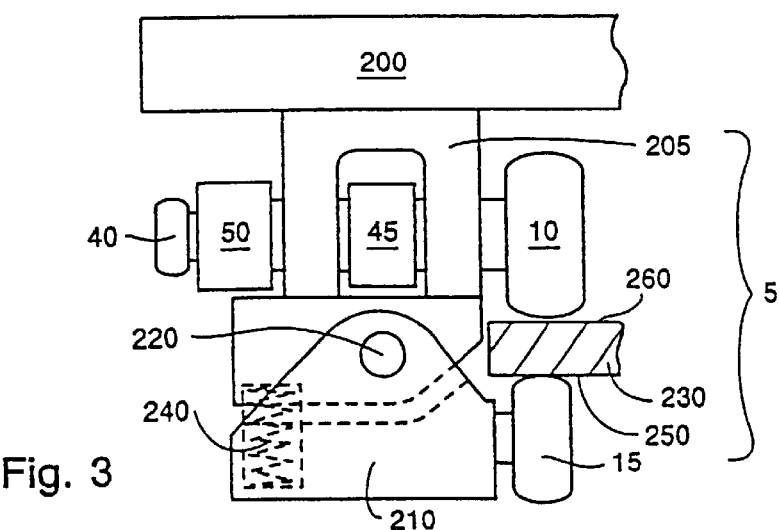
FIG. 3 illustrates one embodiment of the tensioning unit, one embodiment of the compression unit, one embodiment of the track and one embodiment of the roll support of the present invention viewed in the casting direction (the "x-direction").

FIG. 3 is another view of one embodiment of the tensioning unit, one embodiment of the compression unit and one embodiment of the roll support of the present invention as shown in FIGS. 1 and 2 on a track 230. In FIG. 3, looking in a direction along an axis (x-axis) parallel to the casting direction (x-direction) at the roll support 5 including a supporting member 205 extending from support beam flange 200, attachment of the tension unit 50 to the base of pivot roller 40 on each roll support interlinks the individual support beams in the beam chain. The view in FIG. 3 shows how a compression unit 210, which has been pivotally mounted 220 on the supporting member 205, presses counter roller 15 against the track 230 by the force exerted by spring 240 which acts upon the lever created by the pivotally mounted compression unit 210. The compressive force applied by counter roller 15 to the opposed surface 250 of track 230 also transmits compressive force to the main roller 10 causing it to be forced into contact with the upper surface 260 of track 230. In FIG. 3, a needle bearing 45 is shown, upon which a nose member 60 (in FIG. 1) of an adjacent roll support will bear after interlinking of adjacent support beams.

Figure 4:
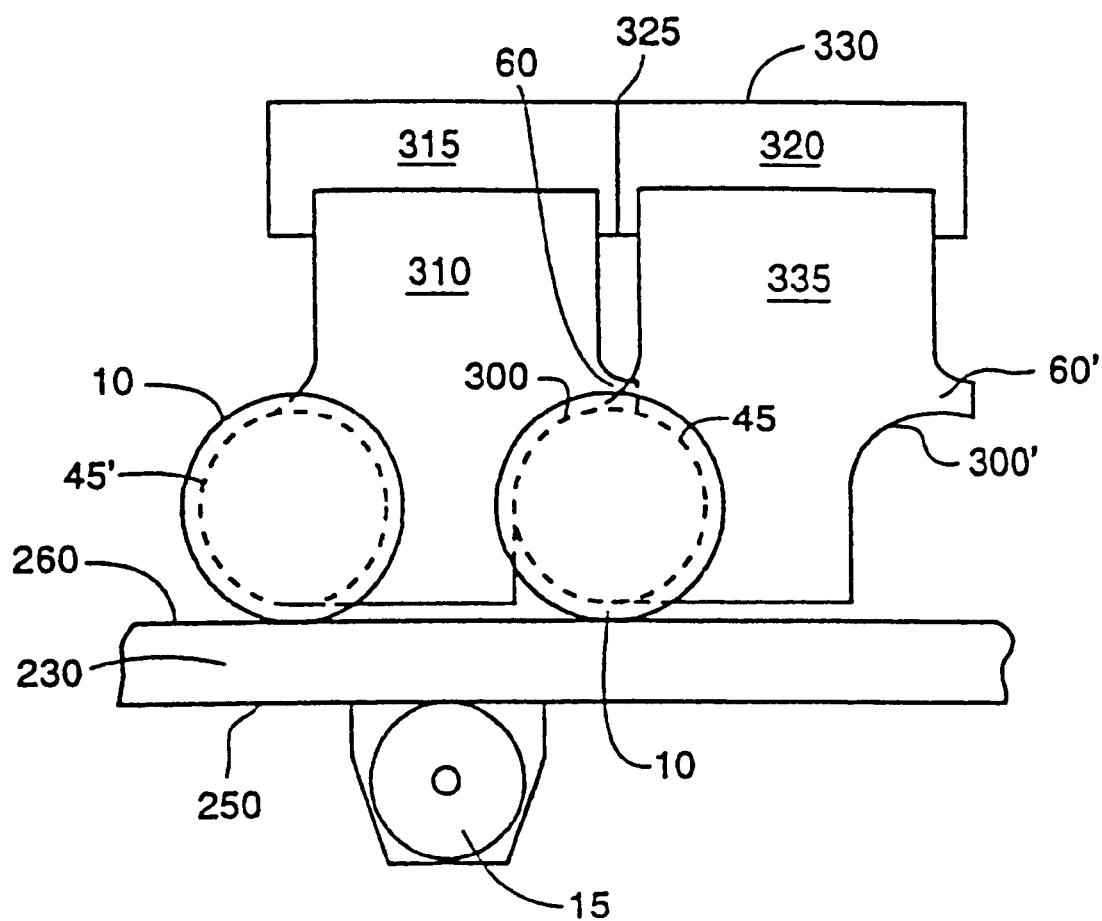
FIG. 4 illustrates one embodiment of the track and one embodiment of the roll support of the present invention viewed in a direction transverse (the "y-direction") to the casting direction.

FIG. 4 illustrates another view of one embodiment of the track and one embodiment of roll support of the present invention. In FIG. 4, looking at the roll support in the y-direction one can more readily understand the roll support of the present invention. The needle bearing 45, shown in FIGS. 1 and 3, can be mated to nose member surface 300 of nose member 60 of roll support 310 shown in FIG. 4. The tensioning unit described previously (not shown) creates a compressive force between support beams 310 and 335, forcing them together at intersection 300 between needle bearing 45 and nose member 60, resulting in the formation of a substantially smooth mold surface 330 when the blocks are under thermal loading, as shown. After the blocks 315 and 320 are thermally loaded, such as during casting, the blocks can make contact with one another along surface 325, although no force is exerted by adjacent blocks upon one another at surface 325. Thus, FIG. 4 shows how multiple support beams can be mated together to form a beam chain. FIG. 4 also shows the positioning of main rollers 10 in relation to the position of counter roller 15. Main rollers 10 are in contact with the upper surface 260 of track 230, and counter roller 15 is offset from the axes of the main rollers 10, and in contact with opposed surface 250 of track 230 as a result of the compressive force applied by the compression unit (not shown).

While nearly any drive system can be used with the pre-stressed beam chains of the present invention, it is desirable to employ a caster drive which does not adversely impact the quality of the cast, such as results from block tilting in the casting region. In particular, the drive system should exert substantially minimal forces on the beam chain through the drive meshing apparatus. Excessive forces can cause beam and block tilting. Preferred drive systems for use in the present invention should not be overly sensitive to manufacturing tolerances and should exhibit little to no reduction in performance due to thermal loading while casting. Such systems can utilize horizontal gear drives, vertical gear drives, wheel drives, sprocket drives or worm gear drives and the like.

In one embodiment, the present invention utilizes a novel worm gear drive system for driving the individual beams in the beam chain along the track guideway and through a casting cycle. The worm gear drive can include a motor connected to a cylindrical shaft having substantially spiral (e.g., helical) channels for accepting the pivot rollers mounted on a support beam. The spiral or helical channels thereby form a thread which runs about the shaft (i.e., such as in a screw). The spiral or helical channels can be formed on the shaft by any suitable method (e.g., machining channels into the shaft or welding a thread onto the shaft). The longitudinal axis of the shaft can be aligned parallel to the beam chain in the x-direction to allow the device for meshing the beam chain with the worm gear (e.g., pivot rollers) mounted on support beams in the beam chain to mesh with the channels in the shaft. As the shaft is rotated, the device for meshing the beam chain with the worm gear (e.g., pivot rollers) in mesh with the channels in the shaft can be driven in the casting direction (or opposite to the casting direction if desired) and around the track. Rotation of the worm gear can be controlled, for example, by control of the motor speed. The motor can be connected to the worm gear using, for example, a linkage of universal gears and drive shafts or the like. For maintaining substantially uniform beam chain speed along the caster track when using a worm gear drive system, a single beam chain can be in mesh with two worm gear drive apparatus, one positioned on either side of a line drawn in the x-direction through the casting region of a caster.

The worm gear drive system is preferred for use in the present invention for several reasons. The worm gear drive can substantially minimize the number of parts required for driving the beam chain along the track and can substantially reduce the space requirements of the drive system. The worm gear drive system can provide reduced obstruction of the caster, allowing relatively easy access to various parts of the caster for maintenance. In contrast to known drive systems, the worm gear can be capable of being in contact with the pivot rollers from as few as one, but preferably at least as many as three beams at any one time. By using a drive system which engages several pilot rollers at once, errors caused by thermal deformations and low manufacturing tolerances during meshing of beams can be reduced because the effects from several beams simultaneously engaged by the drive system can be averaged out between the several beams.

In one embodiment, the worm gear drive system of the present invention includes an improvement for compensating for variations in individual beam pitch due to, for example, deformations in the beams caused during operation of the block caster (e.g., thermal deformations) and/or to deformations in the beams due to wear, manufacturing error or low tolerances. The improvement includes varying the thread pitch of the gear along the longitudinal axis of the shaft in a manner which compensates for variations in individual beam pitch. The variance in thread pitch thereby allows the beams in the beam chain to be maintained in a smoothly adjoining relationship to one another as the beam chain moves along the track of the caster, and deleterious effects (e.g., beams jolting and banging into each other) that can be caused by variation in beam pitch are reduced. The improved worm gear allows for at least two, and preferably three, adjoining beams in a beam chain to move smoothly through the worm gear at one time, whereby the device for meshing the beam chain with the worm gear of at least one of the beams is always engaged with the worm gear, and whereby the transition from a leading beam (beam in front, or farther through the worm gear, relative to another beam) to a lagging beam (beam behind relative to another beam) occurs smoothly, with little or no jolting or banging in spite of variances in the pitch of the beams.

In the improved worm gear, the variations in thread pitch along the longitudinal axis of the cylindrical shaft can be described in sections, although it is to be understood that such description is intended to conceptually describe the improved worm gear, and not to imply abrupt physical separations of sections. The sections include a first section (e.g., an inlet section) which compensates for individual beams of a beam chain having a pitch that is longer than one theoretical beam pitch; a second section (e.g. a constant section) which has a constant beam pitch for moving the beam chain through the gear; and a third section (e.g., an outlet section) which compensates for individual beams of a beam chain having a pitch that is shorter than one theoretical beam pitch. In this embodiment, the above-described helical channels receive the device for meshing the beam chain with the worm gear (e.g., pivot rollers) when the device for meshing reaches the inlet section of the worm gear and axially push the device for meshing through the constant section of the worm gear toward the outlet section of the worm gear.

The thread pitch of the first, or inlet section, is initially about one theoretical beam pitch plus a first correction factor, whereby the thread pitch gradually decreases at a substantially constant rate to about one theoretical beam pitch over a first longitudinal distance. The longitudinal distance is measured along the longitudinal axis of the shaft of the worm gear. This correction in the inlet section compensates for beams having a length greater than one theoretical beam pitch. The correction factor, which should be designed to accommodate anticipated increases in beam pitch, allows the device for meshing of the elongated beam to enter the worm gear without initially engaging the thread face of the gear, and to move gradually into contact with the thread face of the gear to smoothly become engaged by the gear, without jolting or banging the elongated beam into adjoining beams. The elongated beam is initially pulled along by the beam directly in front of it (i.e., the leading beam) which has device for meshing that is substantially already engaged with the thread of the gear. As the device for meshing of the elongated beam gradually comes into contact with the thread face as the thread pitch decreases along the longitudinal axis of the worm gear, the elongated beam becomes engaged by the worm gear without banging or jolting into the leading beam. As the device for meshing on the elongated beam engages the worm gear and moves into the constant section (described below), the leading beam is smoothly pushed off of the thread face (i.e., becomes disengaged) as it moves through the outlet section of the gear (described below). Beams having a beam pitch substantially equal to or less than one theoretical beam pitch move similarly through the inlet section, but do not gain any benefit from the initial increase in thread pitch (i.e., they would have also smoothly entered a gear with a constant thread pitch of one theoretical beam pitch, for example).

The thread pitch of the second, or constant, section of the worm gear is initially about one theoretical beam pitch, and the thread pitch remains substantially constant over a second longitudinal distance. By the time a beam of one theoretical beam pitch or larger reaches the constant section, the device for meshing with the worm gear will be substantially in contact with the thread face (i.e., engaged with the thread face) and will be smoothly driving the beam chain at a substantially constant pace. A beam of less than one theoretical beam pitch will not be initially be engaged in the constant section, but due to the correction factor in the outlet section described below, will gradually become engaged with the thread face as it passes through the constant section.

The thread pitch of the third, or outlet, section of the worm gear is initially about one theoretical beam pitch, whereby the thread pitch gradually decreases at a substantially constant rate to about one theoretical beam pitch minus a second correction factor over a third longitudinal distance. This correction in the outlet section compensates for beams having a length less than one theoretical beam pitch. As described above, a beam having a pitch that is less than one theoretical pitch will not initially be engaged with the thread face of the worm gear as it enters the constant section of the gear described above and therefore, the beam chain will continue to be driven by the engaged beam immediately ahead of the shorter beam (i.e., the leading beam). As the leading beam moves into the outlet section, however, the thread pitch gradually decreases so that the distance between the leading and shorter, lagging beam substantially gradually decreases, allowing the device for meshing of the lagging, shorter beam to smoothly come into contact with the thread face and fully engage the gear. This correction prevents the beam chain from suddenly being "dropped" from engagement and then jolted back into engagement when the leading beam exits the gear and the shorter beam becomes engaged. Additionally, since the change through the outlet section is gradual, the leading and lagging beams do not "bang" together.

The first and second correction factors can be the same or different in a given worm gear. The correction factors are preferably sufficient to provide the compensatory action of the worm gear sections as described above. In one embodiment, the first and/or second correction factor is from about 0.1 mm to about 0.5 mm, and more preferably, from about 0.2 mm to about 0.4 mm, and even more preferably, about 0.3 mm.

The first longitudinal distance in the inlet section is a length sufficient to substantially gradually ease a beam having a pitch greater than one theoretical beam pitch into engagement with the worm gear without deleterious movement (e.g., jolting, banging, etc.) in the beam chain. In one embodiment, the first longitudinal distance is about one theoretical beam pitch plus the first correction factor.

The second longitudinal distance in the constant section is a length sufficient to engage one or more beams such that the beam chain is driven and moved along the track, taking into account the effects of the inlet and outlet sections described herein. In one embodiment, the second longitudinal distance is from about 1 to about 1.5 theoretical beam pitches, with about 1.25 theoretical beam pitches being more preferred.

The third longitudinal distance in the outlet section is a length sufficient to substantially gradually ease a beam having a pitch less than one theoretical pitch out of the worm gear, without deleterious movement (e.g., jolting, banging, etc.) in the beam chain. In one embodiment, the third longitudinal distance is about one theoretical beam pitch minus the second correction factor.

The improved worm gear described above can be of any total length which is suitable for providing the compensatory actions described above. In one embodiment, the total length of a worm gear of the present invention along its longitudinal axis is from at least about 3 to at least about 3.5 theoretical beam pitches, with about 3.25 theoretical beam pitches being more preferred.

Another embodiment of the present invention relates to a method for compensating for variation in individual beam pitch in a beam chain of a continuous block caster which includes providing an improved worm gear as substantially described above as a component of the drive system for the caster.

Yet another embodiment of the present invention relates to a method for compensating for variation in individual beam pitch in a beam chain of a continuous block caster. The method includes the steps of contacting a device for meshing a beam chain with a worm gear which includes a cylindrical shaft having helical channels along the length of the shaft that form a thread having a thread face. The thread has varying pitch to compensate for at least one variation in beam pitch, including: (a) beam pitches longer than one theoretical beam pitch; and (b) beam pitches shorter than one theoretical beam pitch.

FIGS. 16–20 schematically illustrate the progression of two beams through an improved worm gear of the present invention. Beginning with FIG. 16, an improved worm gear is shown which has a cylindrical shaft 910 and helical channels 920 forming a thread 930 that traverses the longitudinal axis of the gear. An exemplary theoretical beam pitch of 201.062 mm is indicated and the approximate location of the inlet, constant and outlet sections is indicated schematically, with the application of the correction to the thread pitch indicated graphically as a ramp above the worm gear. In this figure, the first and second thread pitch corrections are both shown as 0.3 mm. The inlet section has a longitudinal distance of one theoretical beam pitch plus the correction factor (i.e., 201.362 mm); the constant section has a longitudinal distance of 1.25 theoretical beam pitches (i.e., 251.327 mm); and the outlet section has a longitudinal distance of one theoretical beam pitch minus the correction factor (i.e., 200.762 mm). Beam driving rollers spaced one theoretical beam pitch apart (i.e., the beams attached to the rollers have a beam pitch of one theoretical beam pitch) are shown with a leading roller 940 shown engaged with the thread face and a lagging roller 945 shown not engaged (i.e., having a 0.3 mm clearance).

Figure 16:
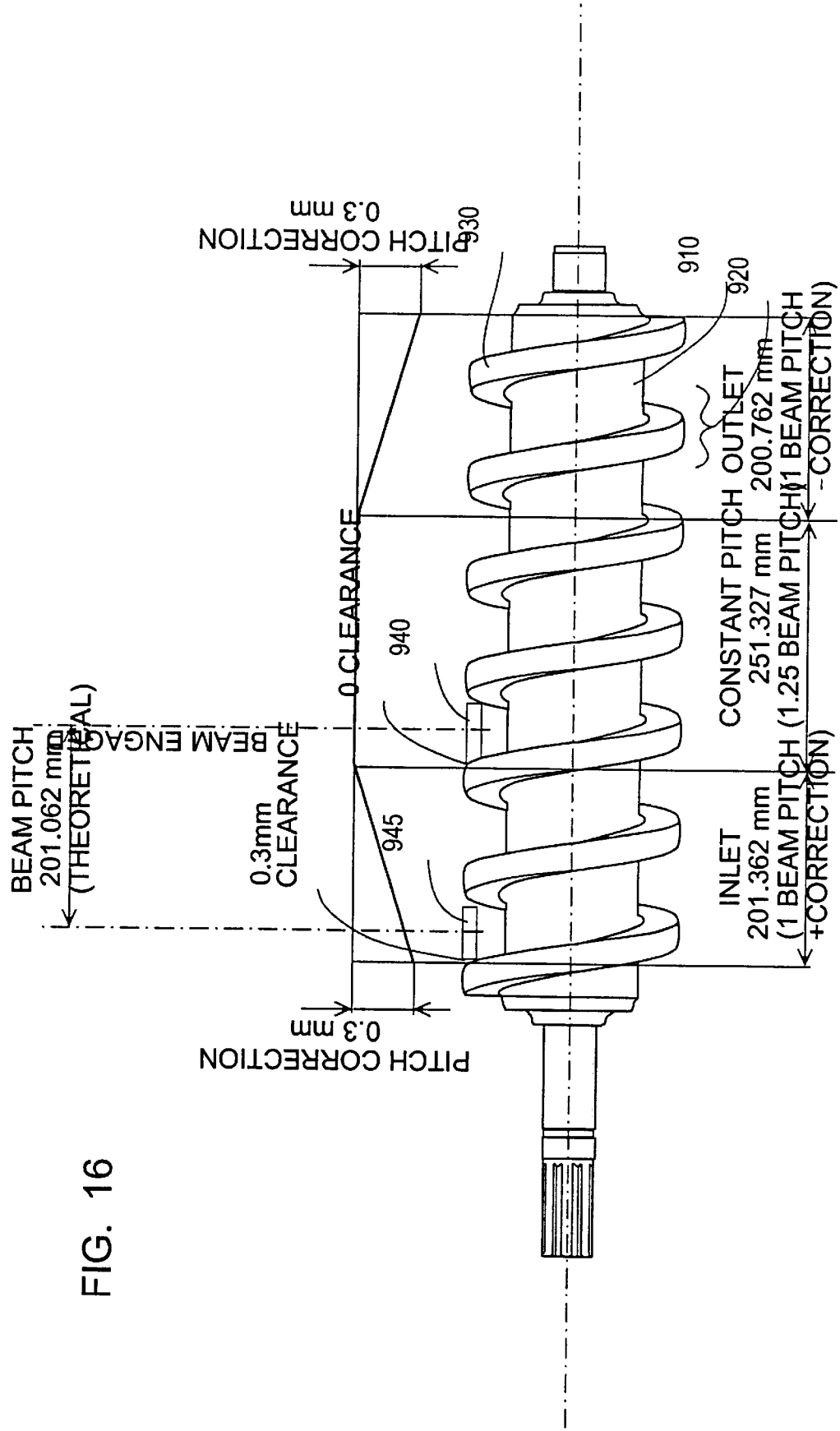
FIG. 16 is a representation of a worm gear of the present invention with pitch correction shown schematically as a ramp.
Figure 17:
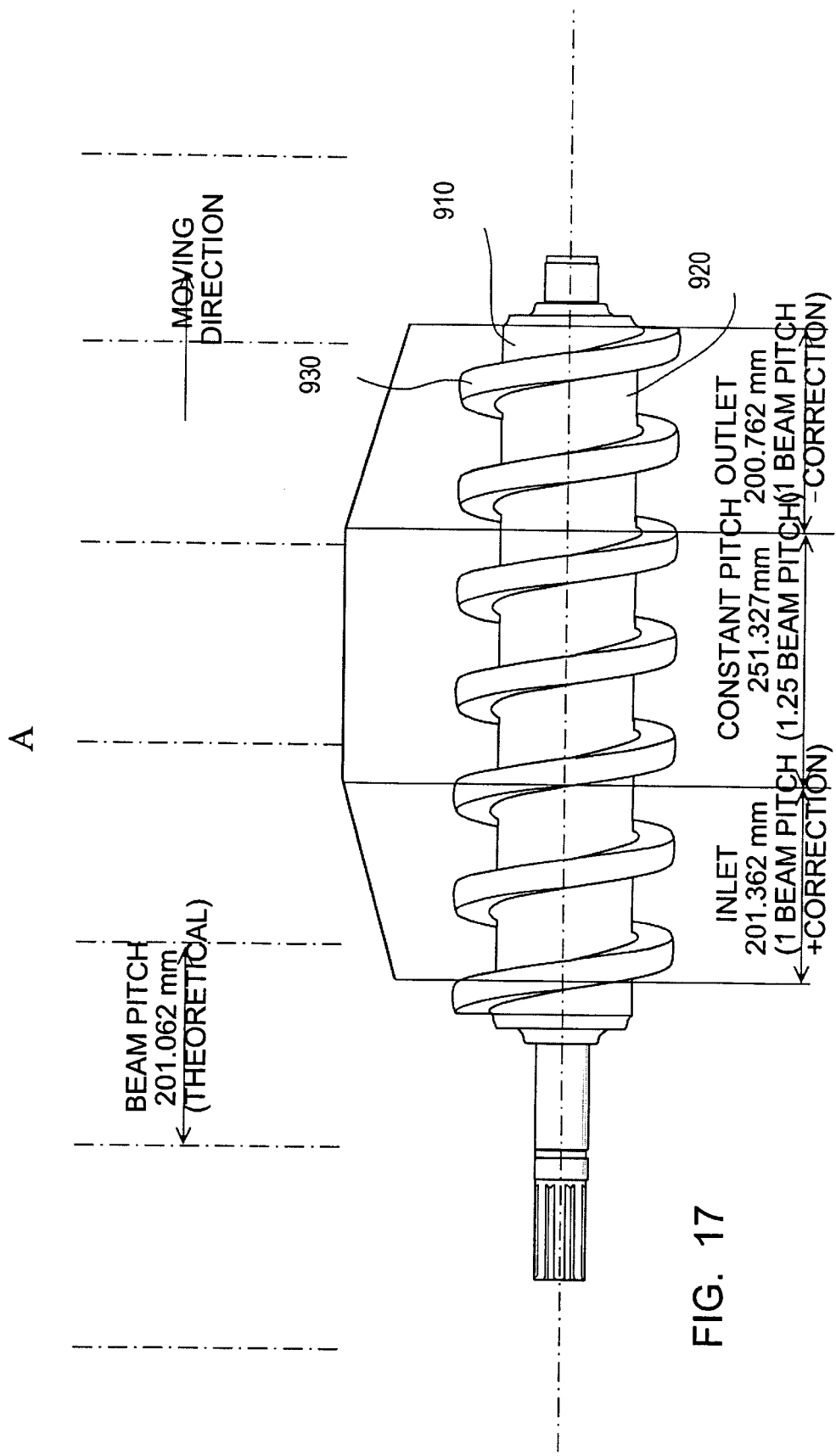
FIG. 17 is a representation of a worm gear of FIG. 16 schematically showing beam A engaged in the constant section.
Figure 18:
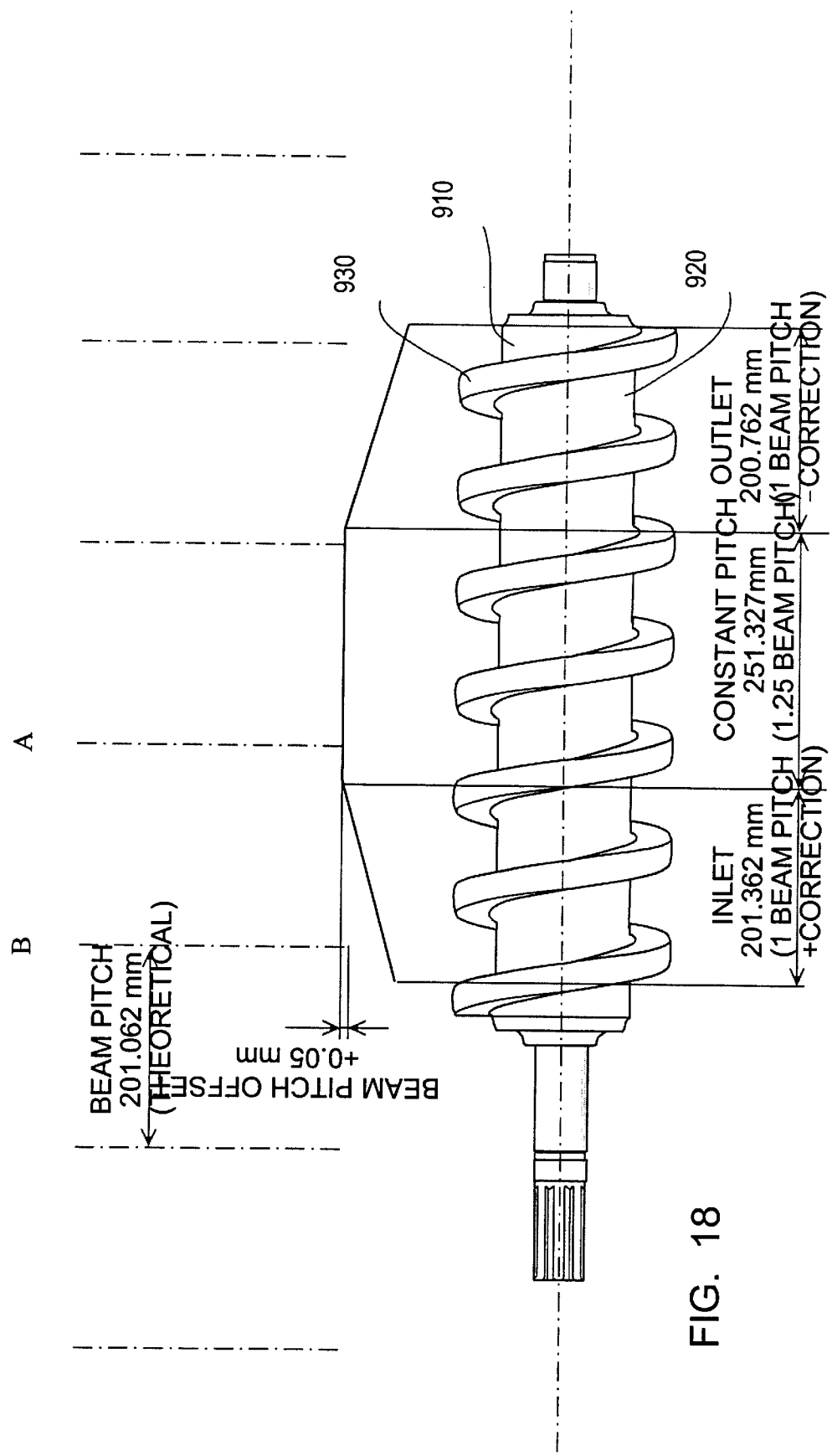
FIG. 18 is a representation of a worm gear of FIG. 16 schematically showing engaged beam A and beam B having a 0.05 mm pitch offset.

FIG. 17 is a schematic drawing of the worm gear depicted in FIG. 16, graphically showing a leading beam "A" engaged by the worm gear at the constant section. FIG. 18 is the same drawing shown in FIG. 17, but with a lagging beam "B" entering the worm gear at the inlet section. Beam B has a beam pitch of 0.05 mm greater than one theoretical beam pitch (i.e., a pitch offset of 0.05 mm). Beam A is engaged with the thread face at the beginning of the constant section and Beam B enters the worm gear offset from the initial point of the engagement on the thread face by approximately 0.25 mm (i.e., 0.3 mm correction factor in thread pitch minus the 0.05 beam pitch offset).

Figure 19:
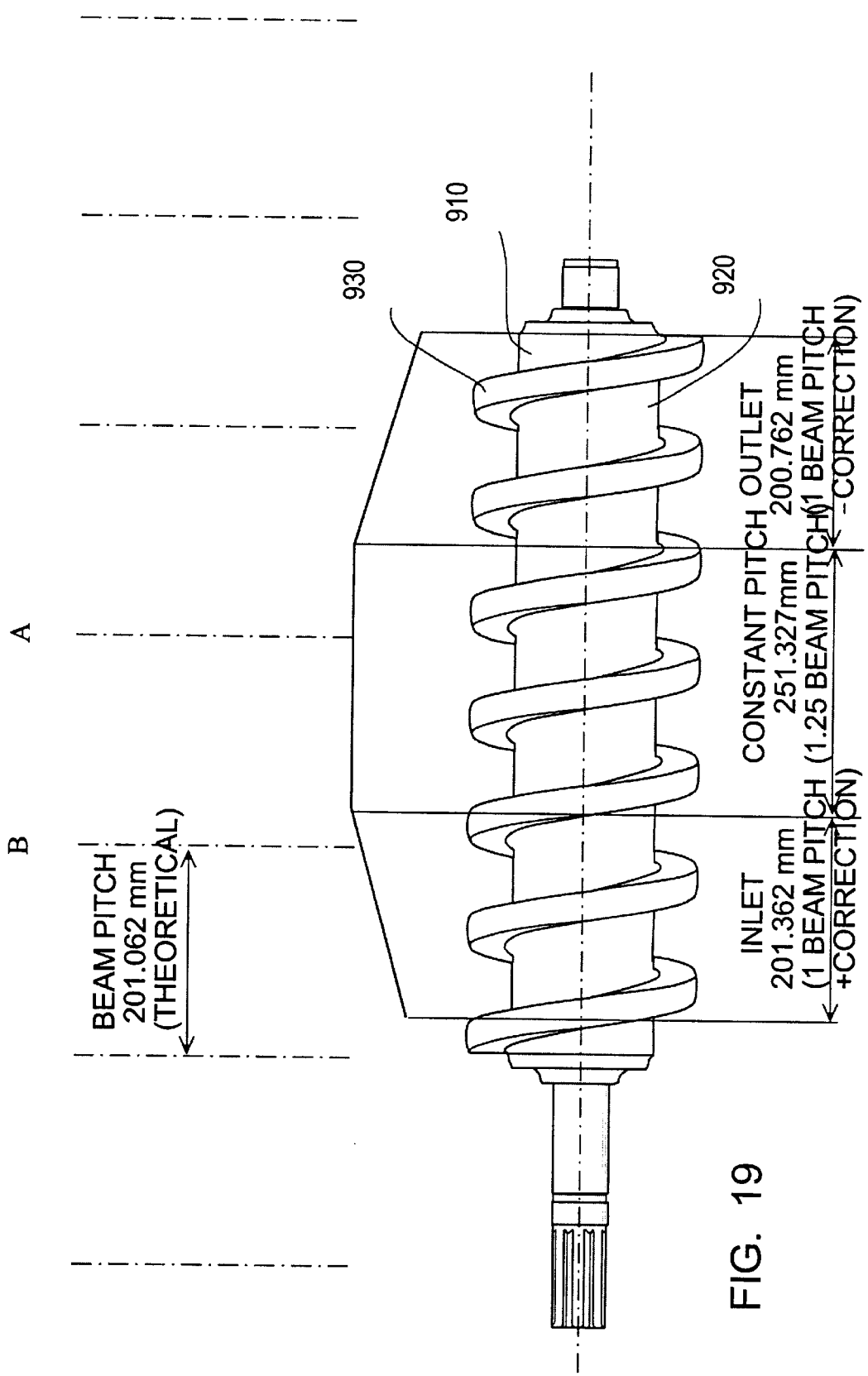
FIG. 19 is a representation of a worm gear of FIG. 18 schematically showing engaged beam A and beam B at an engagement point at the thread contact face during switching of engagement from beam A to beam B.

FIG. 19 shows the worm gear of FIG. 18 at a later point in time, wherein Beam A has moved through the constant section of the gear, remaining engaged with the thread face, and wherein Beam B has gradually moved through the inlet section to a point of initial contact with the thread face. It is at this point that the drive of the beam chain will smoothly switch from Beam A to Beam B.

Figure 20:
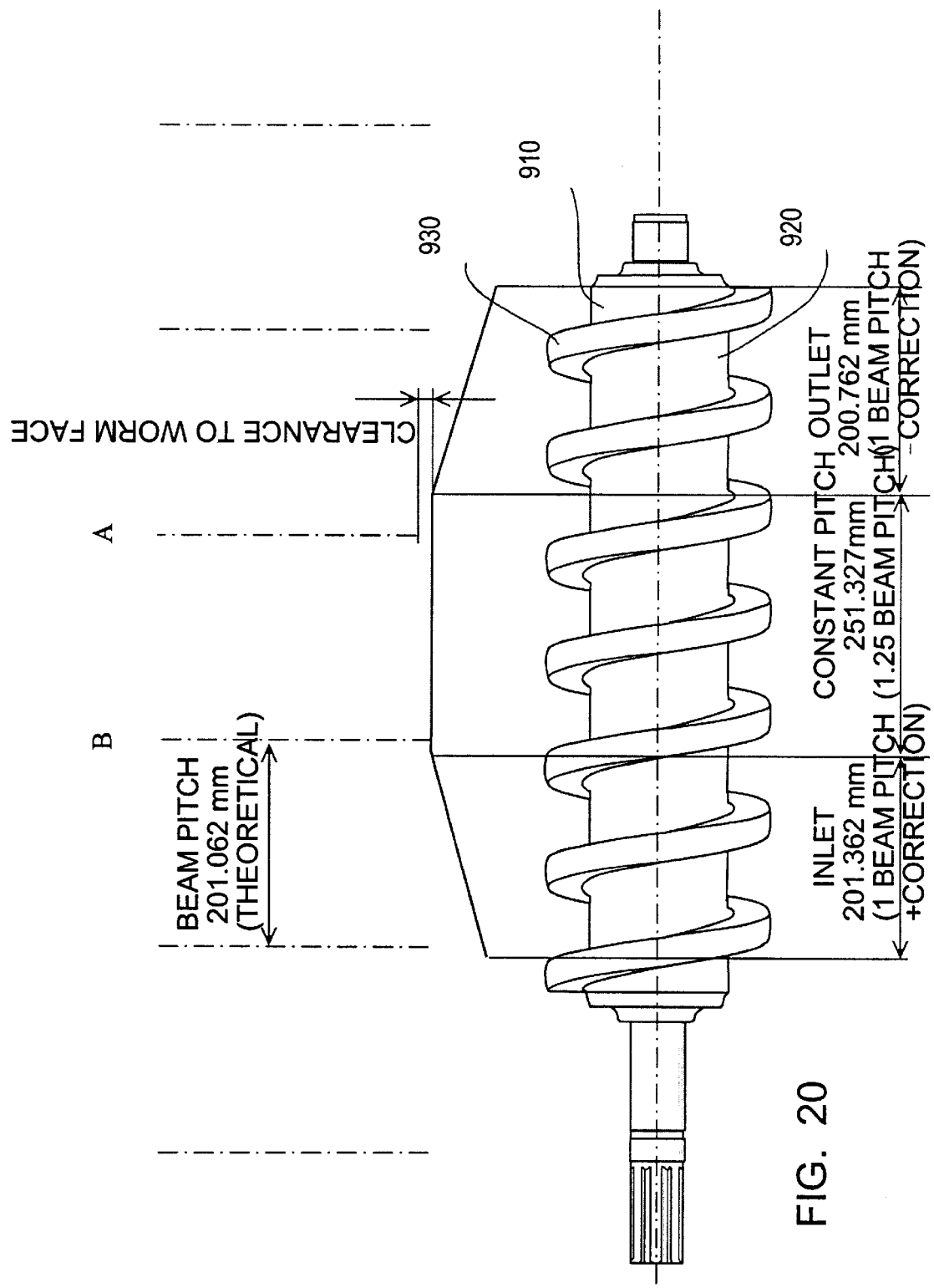
FIG. 20 is a representation of a worm gear of FIG. 19 schematically showing engaged beam B driving a beam chain with beam A pushed off of the thread contact face of the worm gear.

FIG. 20 shows the worm gear of FIG. 19 at a later point in time, where Beam B has entered the constant region, becoming fully engaged with the thread face and driving the beam chain. Beam A has been pushed off of the thread face of the worm gear by 0.05 mm by the engagement of Beam B due to the pitch offset of Beam B.

In the above scenario, if Beam B had been of less than one theoretical beam pitch, for example, minus 0.05 mm, in FIG. 18, Beam B would have entered the inlet section offset by 0.35 mm, assuming that Beam A is of about one theoretical beam pitch or more. In FIG. 19, Beam B would not yet come into contact with the thread face, due to its shorter pitch, and Beam A would still drive the beam chain. As Beam A moved into the outlet section with a decreasing thread pitch, however, as Beam B concurrently moved through the constant section, Beam B would gradually become engaged by the thread face and begin to drive the beam chain.

The movement of counter-rotating beam chains in a caster should be synchronized to obtain the most desirable cast quality. Synchronization of beam chain movement can be achieved through the use of mechanical or electrical systems. Nearly any mechanical or electrical synchronization system can be employed successfully in the present invention. Typically, the synchronization system utilized is dependent upon practical considerations, such as space and economic constraints, for example. In general, the use of two motors (one for driving each beam chain) can require more space, can increase the initial cost of producing the caster and can increase operational costs for the caster. Mechanical synchronization systems, which use shafts, spur gears and other apparatus, can allow the two beam chains to be driven by one motor, however, such systems do not provide as flexible control over beam chain movement as electrical synchronization systems. In the present invention, when using the worm gear drive system and one motor to drive each beam chain, it is preferred to utilize electronic synchronization to control movement of the beam chains because electronic synchronization systems provide for more accurate control and adjustment to the individual beam chain speeds.

Figure 5:
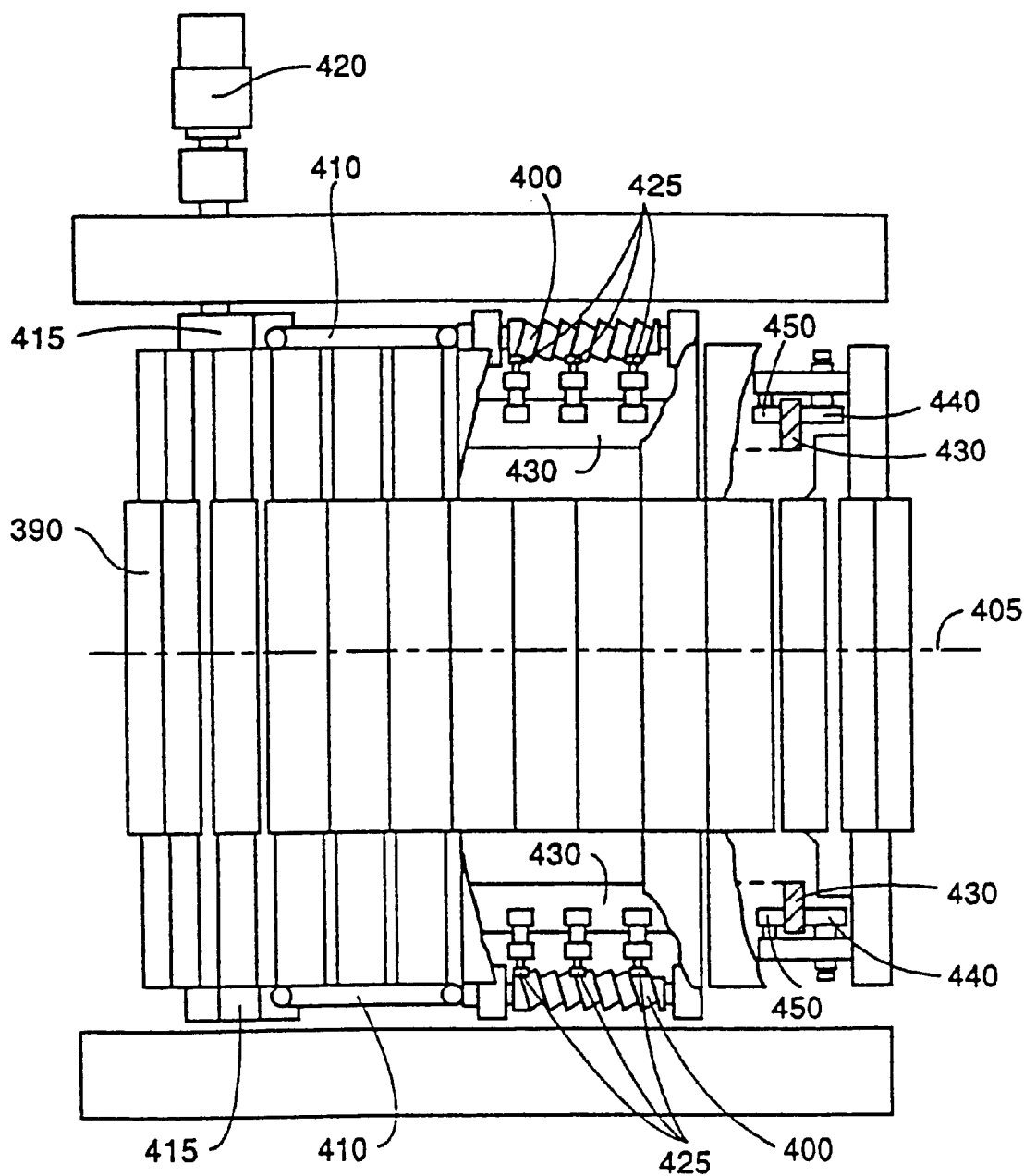
FIG. 5 is a view, in the z-direction, of one embodiment of one beam chain having portions of support beams cut away to view one embodiment of a drive system of the present invention.

The drive systems of the present invention can be better understood by reference to FIG. 5. FIG. 5 illustrates one embodiment of a drive system of the present invention in cut-away view in the z-direction of the surface of a beam chain 390. In FIG. 5, worm gears 400 consisting of a cylindrical shaft having helical channels machined into their length can be placed on each side of axis 405 drawn in the casting direction along a beam chain. Worm gears 400 are driven by, for example, drive shafts 410 which are in turn driven through gearing 415 powered by a motor, such as an electric motor 420.

Worm gears 400 are engaged with pivot rollers 425, which drives the beam chain 390 along the track 430 and through a casting cycle using a roll support having main roller 440 and counter-rollers 450. In the embodiment illustrated in FIG. 5, one motor drive is used for each beam chain, i.e., there are a total of two motor drives used in the entire caster, one for the upper beam chain and one for the lower beam chain, which are electronically synchronized and each motor drives two worm gears.

While each of the components of the novel track and drive systems described herein can be capable of providing enhanced cast quality, it should be understood that it is the combination of the improved track and drive systems which produce the most desirable cast quality. In particular, a substantially planar mold surface can be obtained when using a worm gear drive to synchronously move the pre-stressed beam chains at substantially constant speed through the casting cycle.

The quality of a cast produced by continuous block caster can also be affected by forces generated by the blocks as they travel through the casting cycle. For example, in block casters using elastic chains, the acceleration of the blocks as they negotiate the bends in an elongated oval track can result in banging between the blocks as they exit the bends. The forces propagated by adjacent blocks striking one another can be transmitted through the entire casting cycle, including the casting region, resulting in a reduction in the quality of the cast. In the present invention, however, the use of a pre-stressed beam chain can substantially prevent adjacent blocks from making contact with one another as they are driven through the casting cycle. Moreover, it has also been found that use of a track system which includes at least one movable segment allows for adjustment of track length to compensate for differences between the length of the beam chain and the track length, and helps to maintain compression of the beam chain after changes have occurred in beam chain or track length during casting caused, for example, by thermal loading.

In one embodiment of the present invention, the movable track segment can be a movable "half-moon" placed in one bend of the track. The movable half-moon can be controlled pneumatically, electromagnetically, hydraulically or mechanically, at any time, including during casting, to increase or decrease the force on the beam chain by extending or shortening the track length. The force exerted on the half moon, the rate of change of force exerted on the half-moon or the distance which the half-moon travels can be monitored during casting to determine whether problems, such as seepage of molten metal between blocks, are occurring in the caster, prior to substantial damage occurring to the caster. In a preferred embodiment, a hydraulic cylinder or the like can be operated automatically to provide for constant tension of the pre-stressed beam chain.

The movable segment should be designed to prevent gaps from occurring in the track between the fixed portion of the track and the movable segment which can affect the movement of the beam chain along the track. For example, a two-part sliding apparatus can be used, such that only half of a roller in a roll support of the beam chain is in contact with each half of the two-part sliding track apparatus. Thus, as the track length is extended or retracted, no gaps form in the track because at least one-half of each roller can be in contact with the track at all times.

Figure 6:
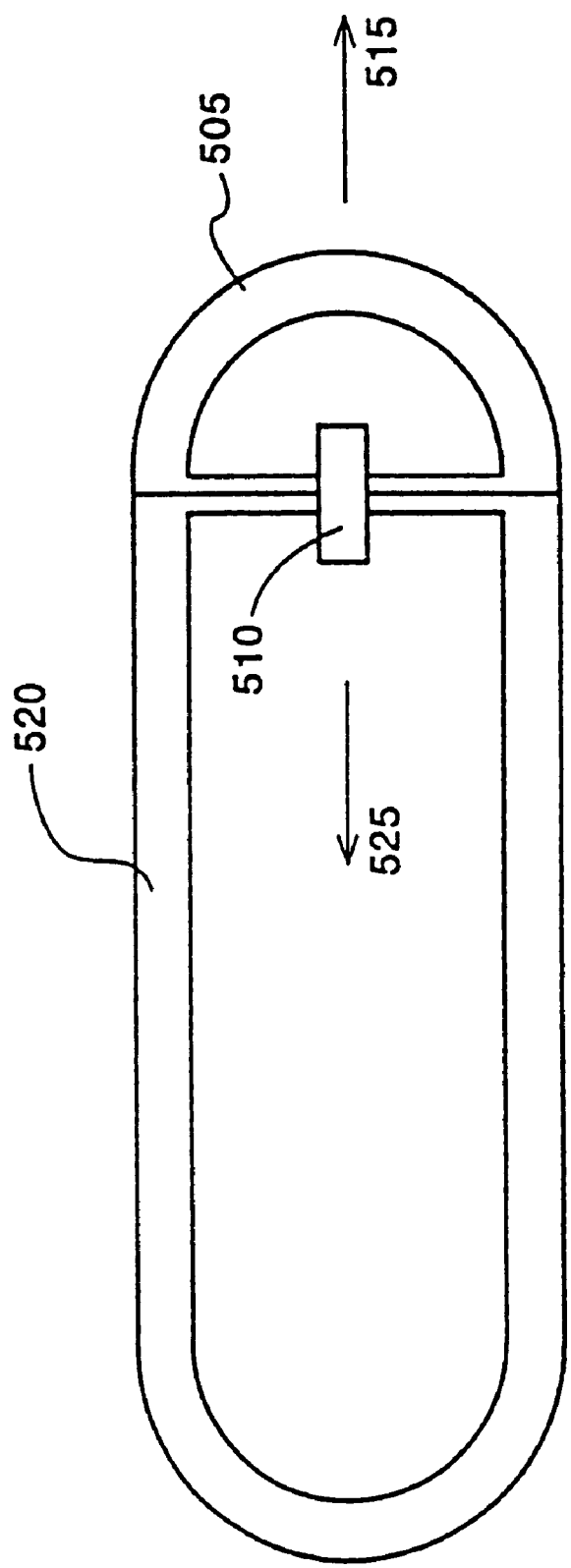
FIG. 6 illustrates one embodiment viewed in the y-direction of a moveable track segment of the present invention.
Figure 8:
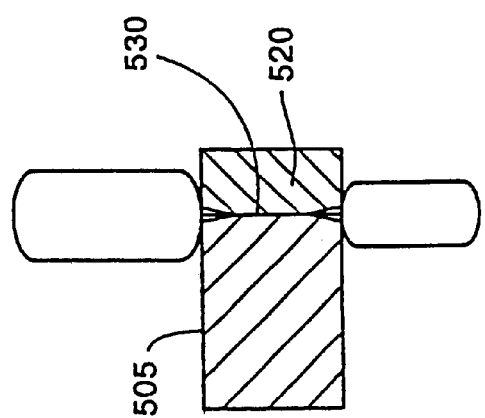
FIG. 8 illustrates one embodiment of the moveable track segment of the present invention shown in FIGS. 6 and 7, showing how the track can be expanded or contracted without affecting the ability of the beam chain to travel along the track.
Figure 7:
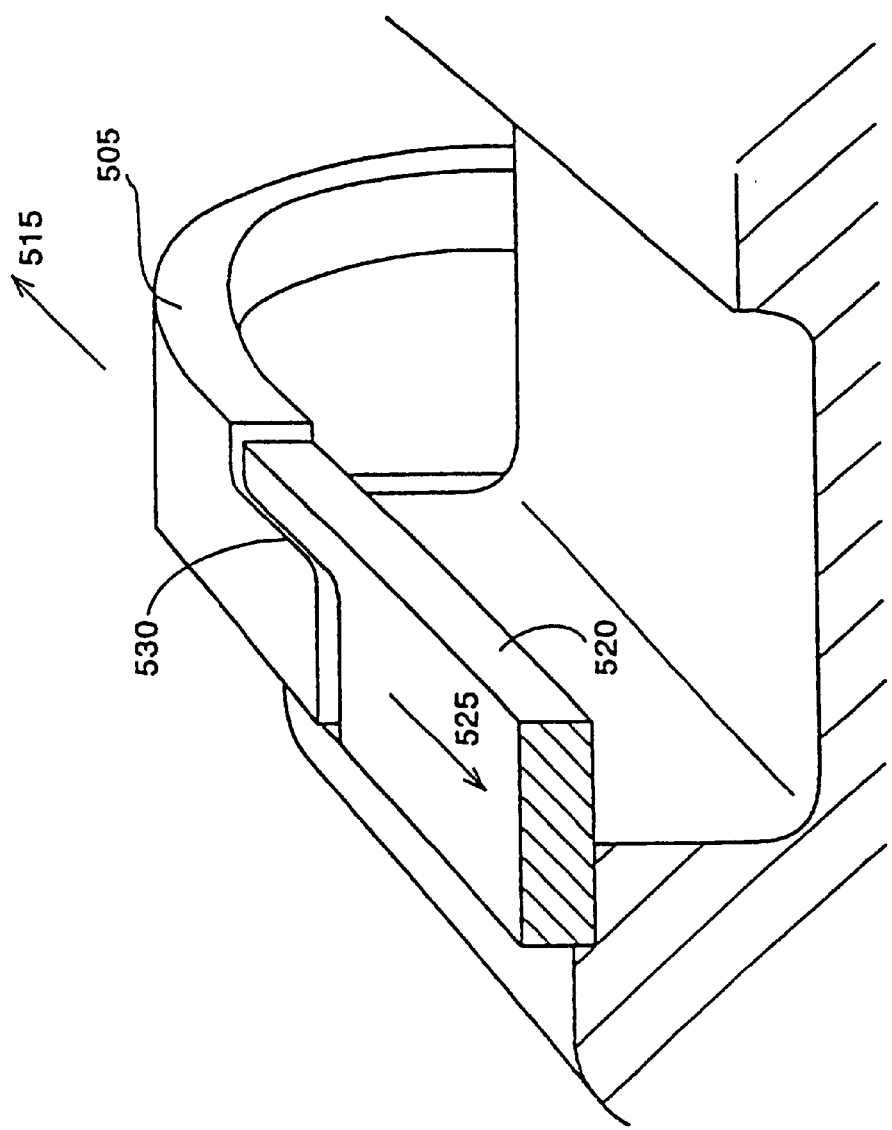
FIG. 7 is a cut-away view of one embodiment of the moveable track segment of the present invention shown in FIG. 6.

A better understanding of the movable segment of the track can be obtained by reference to FIGS. 6 through 8. FIG. 6 illustrates track profile of one embodiment of a movable track segment in the present invention viewed in the y-direction. In FIG. 6, moveable track segment 505 can be moved relative to the fixed portion of the track, for example, by using hydraulic cylinder 510 to move the half-moon in direction 515 to increase the length of track 520 or in direction 525 to decrease the length of track 520. The movement of moveable track segment 505 accounts for differences in track 520 length and the length of pre-stressed beam chain (not shown), such as may result from thermal expansion of the blocks. Hydraulic cylinder 510 can be monitored to ensure that sufficient pressure is applied to the beam chain to allow smooth movement of the beam chain along the track 520 and to prevent excess force from being applied to moveable track segment 505 so as to create forces great enough to overcome the compression forces between blocks in a pre-stressed beam chain, resulting in gaps occurring between chilling blocks.

FIG. 7 is a cut-away view of one embodiment of a movable track segment, such as that shown in FIG. 6. In FIG. 7, movable segment 505 can be moved in direction 515 to extend the track length or can be moved in direction 525 to shorten the track length using, for example, a hydraulic cylinder or the like (not shown). Movable segment 505 can be mated to the track 520 along interface 530 for preventing gaps from occurring as the movable segment 505 is moved, for example, by sliding segment 505 along interface 530. In this manner, the track 520 and movable segment 505 can comprise a two-part sliding apparatus.

FIG. 8 is a cross-sectional view of one embodiment of a two-part sliding apparatus for increasing and decreasing track length. In FIG. 8, movable segment 505 can be slidably moved into or out of the page along interface 530 between movable segment 505 and a portion of the stationary track 520 by, for example, use of a hydraulic cylinder. Because approximately half of a main roller 540 and half of a counter-roller 550 of one embodiment of a roll support of the present invention ride on the track 520 and on the movable segment 505 at any one time, gaps that form between the track and moveable segment during changing of track length do not affect the movement of the beam chain as it travels along the track because approximately half of each roller is supported either by the track or the movable segment.

While not intending the present invention to be constrained by theory, it is also believed that as beams of fixed pitch in a beam chain move from distinct sections of track, i.e., from linear to curved sections of the track, forces can be generated and propagated throughout the beam chain which can reduce cast quality. In the present invention, beams of fixed pitch in a beam chain travel on a track using a roll support or the like. As used herein, the term "speed" when used to describe pivot point speed, refers to the component of the pivot point velocity which is tangential to the track surface. Theoretically, each "pivot point" in the beam chain, (typically the roller axes of rollers of a roll support) can be driven with a constant caster drive speed $V_D$ along the linear sections of track with substantially constant speed $V_1$. Also theoretically, each pivot point in the same beam chain can be driven with caster drive speed $V_D$ along the curved sections of track (having a constant radius of curvature) with substantially constant speed $V_2$. At constant beam pitch and constant caster drive speed $V_D$, pivot point speed $V_2$ will be greater than $V_1$ because pivot points in the curved track sections are forced to travel a greater distance over the curved track surface. Thus, the pivot points of a beam chain having fixed pitches theoretically travel at a first speed $V_1$ in the linear sections of the track, and travel at a second, greater speed $V_2$ in the curved sections of the track.

In practice, however, as the pivot points in a beam chain enter bends in the track, the pivot points have been observed to move with variable speed. In order for the speed of a pivot point to increase, the pivot point must experience acceleration. For example, in a continuous caster which employs elongated, substantially oval tracks, the pivot point must experience acceleration as it leaves a linear section of track and enters the curved section of track. The acceleration of a pivot point entering a bend is not instantaneous, and in general, the pivot point speed is initially slower than the theoretical speed $V_2$. As the pivot point experiences acceleration, its speed increases beyond the theoretical speed $V_2$, then slowly decreases towards the theoretical speed $V_2$. An opposite phenomenon can be observed as a pivot point leaves a curved section of track and enters a substantially linear section of the track, i.e., exits a bend in the track. Such pivot point speed and acceleration variation is referred to herein as the "polygon effect". The polygon effect can cause reduction in the cast quality as the forces generated are propagated throughout the beam chain, particularly in the casting region. While the typical track profile of an elongated oval has been specifically discussed, the polygon effect can be observed in nearly any track configuration. In accordance with the present invention, methods and apparatus are provided for reducing the polygon effect and the resultant decrease in cast quality. Such methods and apparatus are not constrained to any particular track geometry.

Figure 9:
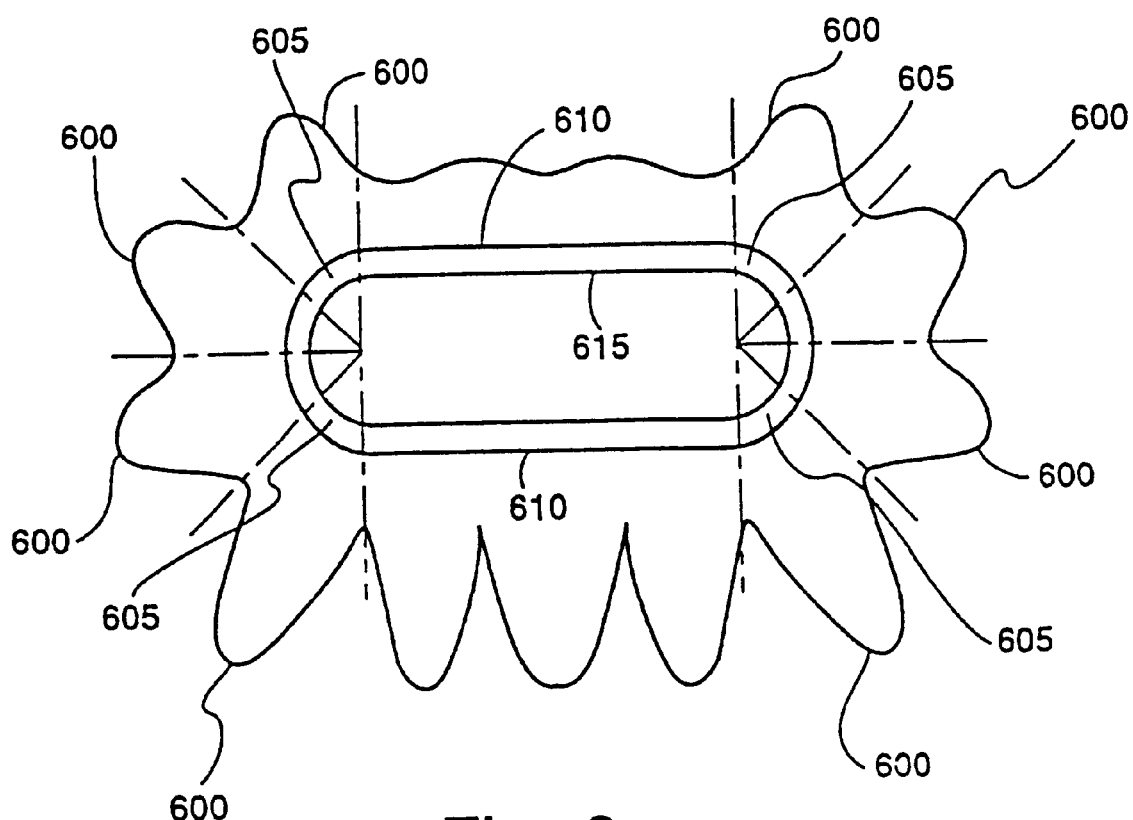
FIG. 9 is a diagram of acceleration forces propagated in a known block caster by a beam chain as a result of the polygon effect.

A better understanding of the polygon effect can be obtained by reference to FIG. 9. FIG. 9 is an illustration of how the polygon effect can be propagated as rollers connected by fixed pitches, i.e., rollers in a roll support, travel from substantially linear sections of an elongated, substantially oval track to a curved sections of the track and vice versa. The illustration in FIG. 9 represents speed variations of pivot points in a beam chain of fixed pitches being driven at constant drive speed along the bottom track of a horizontal caster which does not compensate for the polygon effect. In FIG. 9, a y-direction profile of a track in a horizontal block caster shows that a plot of pivot point speed 600 created in the bends 605 can be propagated through the beam chain to the straight segments 610 of track 615, resulting in reduction in the quality of the cast. The sinusoidal shape of the pivot point speed 600 illustrates the pivot point speed variations, referred to herein as the "polygon effect". Because the blocks are engaged by the drive system before entering the casting region (i.e., in one of the two bends), the speed variations are observed to be dampened in the casting region relative to the other portions of the track.

As used herein, the phrase "polygon effect compensating curves" refers to modifications in the caster track which have the effect of reducing the polygon effect and reducing the decrease in cast quality as a result of the polygon effect. For example, in a continuous caster which employs elongated, substantially oval tracks, the sinusoidal variation in pivot point speed can be reduced by the placement of polygon effect compensating curves at the entrance or exit (or both) to at least one bend in the track. The effect of the track modification can be to increase pivot point speed more rapidly (increase pivot point acceleration) at the entrance to the bend, then to reduce pivot point speed (decelerate the pivot point) as the pivot point moves through the length of track corresponding to one pitch. Different track geometries, however, create different speed variations, and polygon effect compensation curves can be obtained and used for such different track geometries. Different track geometries include, without limitation, tracks having two or more interconnected linear sections.

One example of a polygon effect compensating curve which can be used in an elongated, substantially oval track can be a section of track inserted at the entrance to a bend in a track (i.e., where a substantially linear portion of a track begins to become curved) which decreases the slope of the track, then rapidly increases the slope of the track, i.e., the compensating curve can be sinusoidal when viewed in the y-direction. These adjustments can be made to one or more entrances to the bends in a track, to one or more exits to the bends in a track, or to both at least one entrance and at least one exit to a bend in a track. The benefits of polygon effect compensation in this manner are realized if only one track profile adjustment is made, however, the polygon effect compensation observed generally increases with the number of adjustments made. Thus, the most desirable polygon effect compensation can be obtained when polygon effect compensating curves are used at all the entrances and all the exits to bends in a track.

Figure 10:
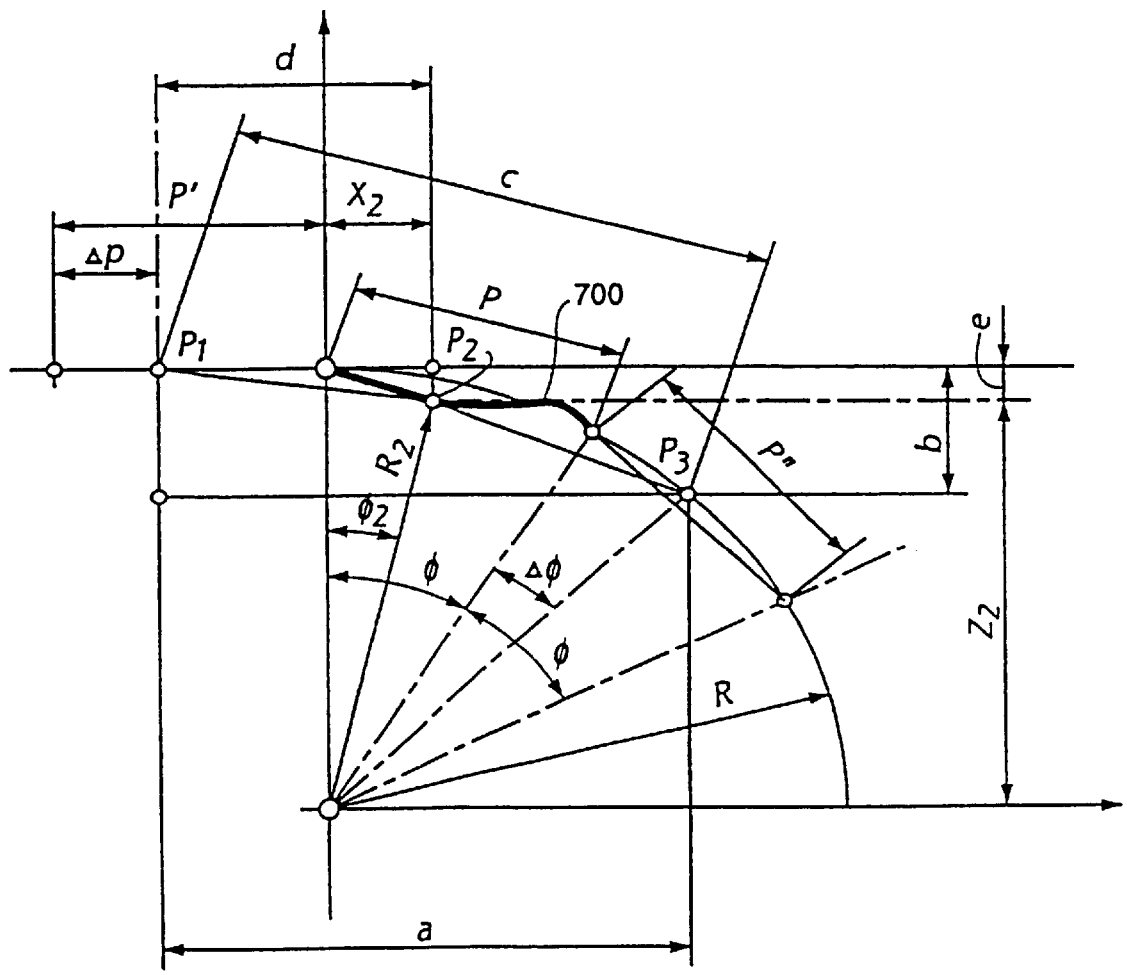
FIG. 10 illustrates a pivot point travel path used in determining one embodiment of the polygon effect compensation curves of the present invention.

One can gain a better understanding of how the polygon effect compensation curves can be obtained by reference to FIG. 10. In one embodiment of the methods and apparatus of the present invention, as shown below and in the drawing in FIG. 10, the polygon effect compensating curves for an elongated, substantially oval track for use in a continuous block caster can be calculated indirectly as a function of the relative position (δ) of a pivot point in a pivot point path. Ideally, a pivot point travel path 700 for pivot point $P_2$ is desired such that the relative position of pivot point $P_1$ in the last pitch p' of the linear section of the track, i.e., $$\frac{\Delta p}{p},$$

is substantially equivalent to the relative position of a preceding pivot point $p_3$ in the second pitch p" of a bend, i.e., $$\frac{\Delta\phi}{\phi},$$

as the pivot points move along the track. Thus, $$\delta = \frac{\Delta p}{p} = \frac{\Delta\phi}{\phi}.$$

The desired pivot point travel path 700 for pivot point P2 can be calculated from the following formulae where the pitch (p) and the sum of pitches in both bends in the track (n) are known:

$$\phi = \frac{2\cdot\pi}{n}$$

$$R = \frac{p}{2\cdot\sin\left(\frac{\pi}{n}\right)}$$

$$a = p\cdot(1-\delta) + R\cdot\sin(\phi\cdot(1+\delta))$$

$$b = R - R\cdot\cos(\phi\cdot(1+\delta))$$

$$c = \sqrt{a^2 + b^2}$$

$$d = \frac{1}{\sqrt{1+\left(\frac{b}{a}\right)^2}}\cdot\left[\frac{c}{2} + \frac{b}{a}\cdot\sqrt{p^2 - \left(\frac{c}{2}\right)^2}\right]$$

$$e = \frac{1}{\sqrt{1+\left(\frac{b}{a}\right)^2}}\cdot\left[\frac{b}{a}\cdot\frac{c}{2} - \sqrt{p^2 - \left(\frac{c}{2}\right)^2}\right]$$

$$x_2 = p\cdot(\delta - 1) + d$$

$$z_2 = R - e$$

$$R_2 = \sqrt{x_2^2 + z_2^2}$$

$$\phi_2 = \text{if}\left(x_2 = 0, 0, \text{atan}\left(\frac{x_2}{z_2}\right)\right)$$

$$\Delta R_2 = R_2 - R$$

Where: R=Radius of the pivot point travel path as the pivot point moves through a bend in a track;
φ=bend angle for one pitch of a bend in the track;
$R_2$=calculated desired radius of the pivot point travel path for pivot point $P_2$;
$\Delta R_2$=calculated change in pivot point travel radius for a given δ; and
$\phi_2$=calculated bend angle for a given δ.

The polygon effect compensation curves for the track can be determined by changing the track radius a substantially equivalent amount to the change $\Delta R_2$ in pivot point travel radius R, at a calculated bend angle $\phi_2$, i.e., providing a track profile which results in the desired pivot point travel path 700. It has been observed that for the polygon effect compensating curves in an elongated, oval track to provide the most desirable effect, each bend in a track should be at least about 3 pitches long.

Although polygon effect compensating curves can be derived mathematically, such curves can also be obtained through, for example, the use of computer aided design (CAD) systems or the like. Moreover, one need not use mathematically calculated polygon effect compensating curves to obtain some of the benefits of the present invention. For example, satisfactory results can be obtained through the use of approximated compensating curves.

Figure 11:
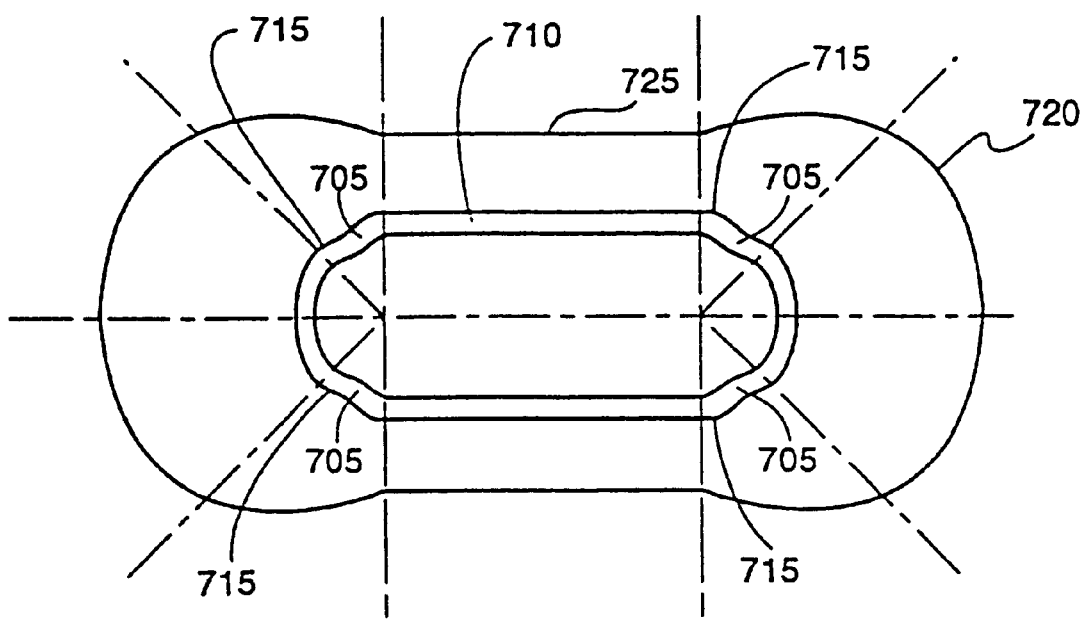
FIG. 11 illustrates one embodiment of the polygon effect compensation curves of the present invention and the effect using such curves has on polygon effect forces.

A better understanding of the polygon effect compensating curves of the present invention can be obtained by reference to FIG. 11. FIG. 11 illustrates one embodiment of polygon effect compensating curves of the present invention in an elongated, substantially oval track viewed in the y-direction. In FIG. 11, polygon effect compensating curves 705 have been placed in the track profile 710 at the entrance and exits to the bends 715 of the elongated oval track. Polygon effect compensating curves 705 are sinusoidal when viewed in the y-direction, for compensating for the sinusoidal nature of pivot point speed. A track having a profile including polygon effect compensating curves 705, such as is shown in FIG. 11, reduces the polygon effect, as is shown by the smooth pivot point speed diagram 720 shown in FIG. 11. The dampening and smoothing of the polygon effect results in substantially constant pivot point speed in the linear sections 725 of the track. Therefore, while the polygon effect can not be completely eliminated, variations in pivot point speed can be substantially minimized by using the polygon effect compensating curves 705 in the entrance and exits to the bends 715 of track 710.

Even when compensating for the polygon effect, forces propagated by the block masses as the blocks rotate through the bends in the track can be transmitted to other blocks in the beam chain and can affect the quality of the cast. It has been found, however, that rotational forces of the block masses can be reduced by offsetting the occurrences of these rotational forces. In a block caster using an elongated oval-shaped track profile, offsetting of the rotational forces can be accomplished by providing track profiles which provide for (1) an uneven number of blocks in a track, and an even sum of blocks in all the bends in the track, (2) an even number of blocks in a track, and an uneven sum of blocks in all the bends in the track, or preferably, (3) an uneven number of blocks in a track, and an uneven sum of blocks in all the bends in the track. The term "bend" as used herein, refers to the semicircular end portions of the track beginning and ending at the points where the track changes from substantially linear portions to curved portions. Thus, in a typical oval track, there are two "bends." The number of blocks in a beam can be adjusted by adjusting track length. The number of blocks in the bends in a track can be adjusted, for example, by adjusting the radii of the bends. In many cases, the radii of the two bends in the track can be substantially the same.

In a preferred embodiment, when using an elongated oval track, in order to offset the rotational forces, the number of blocks (or beams) in a beam chain and the sum of the blocks in both bends of the track should obey the following mathematical formulae:

$$l = 1 + 2i$$

$$m = 1 + 2k$$

where l=the total number of blocks in a beam chain;
m=the sum of the blocks in both bends of a track;
i=integer ∈{3,4,5,6,7, . . . };
k=integer ∈{1,2,3,4,5, . . . }; and
where i ≧ k+2.

Moreover, it has been found that when compensating for rotational forces in this manner, the radii (R) of pivot point travel paths for the bends of the track can be determined by the formula:

$$R = \frac{p}{2\sin\left(\frac{\pi}{m}\right)}$$

where:
  m is in the range of about 0.5+2k and about 1.5+2k; and
  p=pitch, i.e., the fixed distance between pivot points in a beam chain.

Figure 12:
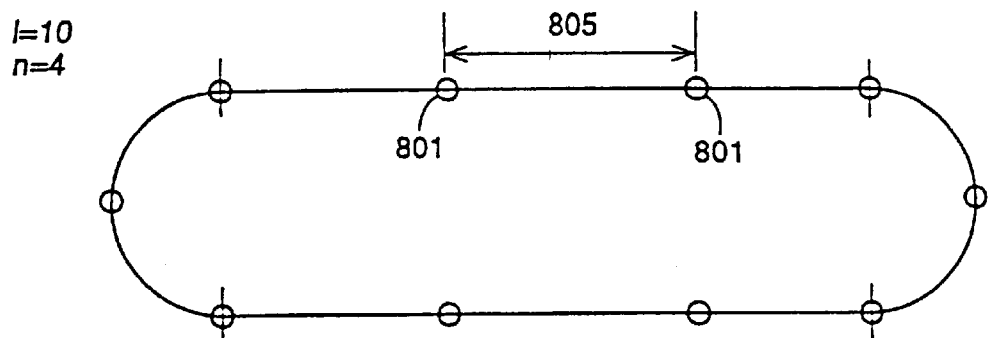
FIG. 12 illustrates a known track profile which does not compensate for rotational forces generated by blocks.
Figure 13:
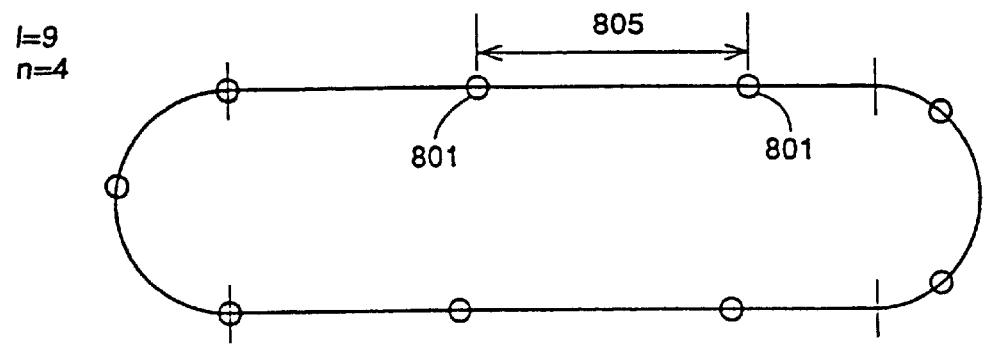
FIG. 13 illustrates one embodiment of a track profile of the present invention which partially compensates for rotational forces generated by blocks.
Figure 14:
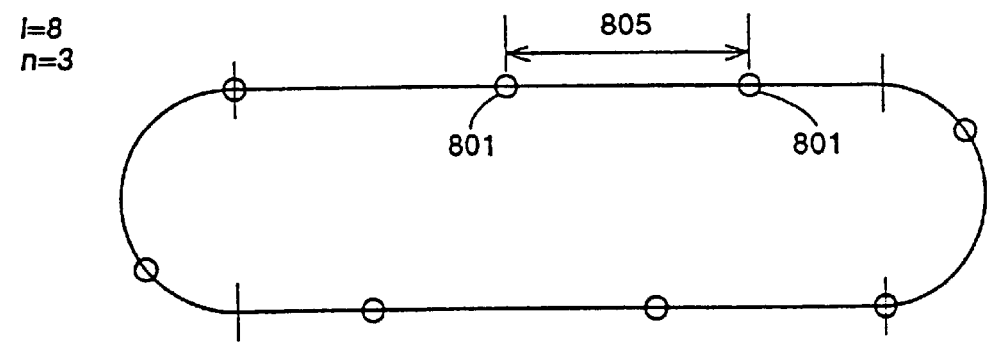
FIG. 14 illustrates another embodiment of a track profile of the present invention which partially compensates for rotational forces generated by blocks.
Figure 15:
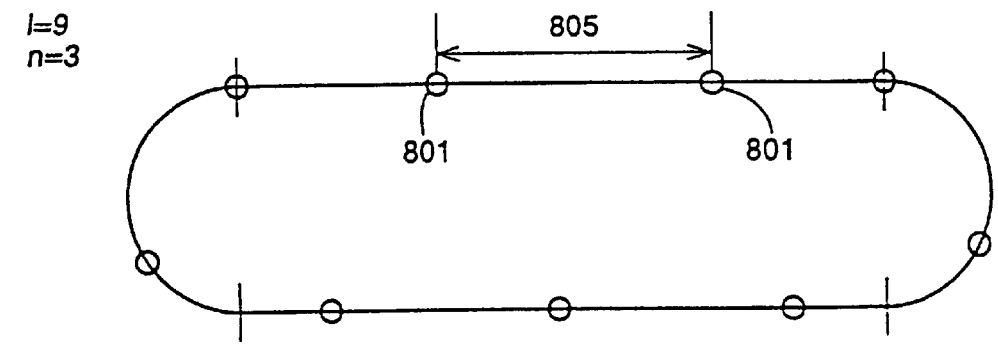
FIG. 15 is an illustration of yet another embodiment of the present invention which compensates for rotational forces generated by blocks.

The rotational forces offset system can be more easily understood by reference to FIGS. 12 through 15. FIG. 12 represents a view of a beam chain profile in the y-direction of a known block caster which does not compensate for rotational forces created by blocks moving through a casting cycle. FIGS. 13, 14 and 15 illustrate embodiments of the present invention for compensating for rotational forces created by blocks moving through a casting cycle. In FIGS. 12 through 15, beam chain profiles in an elongated oval shape have a number of pivot points 801 defined by the location of the main rollers in the beam chain. The distance between pivot points, i.e., the pitch of a block in the chain, is numbered 805. By counting the number of pitches between pivot points, the numbers of blocks in a beam chain and the number of blocks in the bends in a track can be determined.

In FIG. 12, the number of blocks in the beam chain is even (10), and the sum of blocks in the bends of the track is even (4). In this case, the rotational forces created by block masses traveling through the casting cycle are substantially at a maximum. None of the rotational forces have been offset.

In FIG. 13, by changing one of the radii of the bends of the track, the number of blocks in the beam chain can be changed to an odd number (9), however, the sum of the blocks in the bends remains even (4). In this case, the rotational forces have been only partially offset and typically can result in about a 25 percent decrease in the amplitude of forces transmitted by the blocks through the beam chain compared to rotational blocks when in the positions shown in FIG. 12.

In FIG. 14, both radii of the bends have been changed to give an uneven sum of blocks in the bends (3), however, the number of blocks in the beam chain is now even (8). Similar to the case in FIG. 13, the rotational forces have been partially offset and typically can result in about a 25 percent decrease in the amplitude of forces transmitted by the blocks through the beam chain compared to rotational forces created by blocks when in the positions shown in FIG. 12.

In FIG. 15, however, the manipulation of the radii of the bends in the track and the length of the track provides for an odd number of blocks in the beam chain (9), and an odd sum of blocks in the bends of the track (3). In this case, the rotational forces created by the blocks can be substantially offset, reducing the negative impact these forces can make on the cast. Implementation of the solution shown in FIG. 15 can result in about a 90 percent decrease in the forces transmitted by the blocks through the beam chain compared to rotational forces created by blocks when in the positions shown in FIG. 12.

While each individual improvement in the apparatus of the track and drive systems of the present invention can be useful for improving cast quality, when used in concert, the track system and drive system improvements can be particularly useful for enhancing cast quality, such as by providing a substantially planar casting surface and for reducing forces generated by the blocks traveling through the casting cycle.

The methods of the present invention comprise methods for using the apparatus of the present invention. In the method of the present invention, metal can be continuously cast in a block caster which includes the improved track and drive systems. In one embodiment of the methods of the present invention, molten metal, for example, aluminum, aluminum alloys, or steel can be supplied from a tundish or the like to the moving mold of a block caster, where it can be solidified and removed from the caster as a strip, sheet or slab. The moving mold can comprise two beam chains, such as pre-stressed beam chains, disposed in close relation to one another, traveling in synchronized fashion through casting cycles. The prestressed beam chains can be further comprised of several support beams and block assemblies interconnected by tensioning units which interlink and compress adjacent beams together.

The prestressed beam chain can also include a roll support comprising a main, load bearing roller and a counter-roller for transporting the beam chain along a track. The track can include at least one movable segment, such as a half-moon, for adjusting for differences in the length of the track and the beam chain. As the beam chain travels along the track, the movable track segment can be adjusted to accommodate changes in the beam chain length, for example as a result of thermal loading. Moreover, the force exerted, the rate of changes in the force exerted, and/or the distance traveled by the movable segment on the beam chain can be monitored to determine whether problems are occurring in the caster.

The methods of the present invention can include driving a beam chain along a track using an improved drive system, preferably a worm gear drive. The worm gear drive system can include a pair of worm gears positioned on either side of each beam chain in mesh with pivot rollers or the like mounted on the beam chain. The worm gear drives can be synchronized using an electrical or a mechanical synchronization system, but preferably an electrical synchronization system.

In a preferred embodiment the methods of the present invention can comprise a method for continuously casting aluminum alloys, such as aluminum alloy container stock, for use in the manufacture of containers and the like. For example, molten aluminum can be provided to a moving mold of a block caster utilizing the improved track and drive systems of the present invention, solidifying the molten metal into a cast aluminum strip, and removing such cast strip from the casting region of a continuous block caster for use as container stock in the manufacture of aluminum containers and the like.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. An apparatus for driving a beam chain along a track in a continuous block caster, the beam chain supporting a cast slab and having at least one variation in beam pitch along a length of the beam chain due to heating of one or more of the supporting beams by the cast slab, comprising:
  (a) a motor;
  (b) a worm gear connected to said motor, said worm gear disposed next to said beam chain;
  (c) device for meshing said beam chain with said worm gear; and
    wherein said motor is capable of energizing said worm gear such that said worm gear is capable of engaging said device for meshing said beam chain with said worm gear to cause said beam chain to move along a track in a continuous block caster and wherein at least a portion of the worm gear has a thread pitch that is about one theoretical beam pitch plus a correction factor, the correction factor being related to the at least one variation in beam pitch.

2. The apparatus as claimed in claim 1, comprising multiple worm gears.

3. The apparatus as claimed in claim 2, wherein said beam chain is in mesh with multiple worm gears.

4. The apparatus as claimed in claim 3, wherein said beam chain is in mesh with two worm gears.

5. The apparatus as claimed in claim 1, wherein said beam chain is capable of being moved by said worm gear in the casting direction.

6. The apparatus as claimed in claim 1, wherein said beam chain is capable of being moved by said worm gear in a direction opposite to the casting direction.

7. The apparatus as claimed in claim 1, wherein said worm gear comprises a cylindrical shaft having helical channels along the length of said shaft thereby forming a thread, and wherein said worm gear comprises variations in thread pitch to compensate for variations in beam pitch.

8. The apparatus as claimed in claim 1, wherein said worm gear comprises a cylindrical shaft having helical channels along the length of said shaft thereby forming a thread, and wherein said motor is capable of energizing said worm gear such that said helical channels are capable of receiving said device for meshing said beam chain with said worm gear when said device for meshing reaches an inlet section of said worm gear to cause said beam chain to move and axially push said device for meshing through a substantially constant section of said worm gear toward an outlet section of said worm gear; and, wherein the thread pitch of said inlet section initially is about one theoretical beam pitch plus a first correction factor, said thread pitch gradually decreasing at a substantially constant rate to about one theoretical beam pitch over a first longitudinal distance;

wherein the thread pitch of said substantially constant section initially is about one theoretical beam pitch, said thread pitch remaining substantially constant over a second longitudinal distance; and, wherein said thread pitch of said outlet section initially is about one theoretical beam pitch, said thread pitch gradually decreasing at a substantially constant rate to about one theoretical beam pitch minus a second correction factor over a third longitudinal distance and wherein the correction factor is at least one of the first and second correction factors.

9. The apparatus as claimed in claim 1, wherein said motor and worm gear are capable of moving said beam chain at substantially constant speed along said track.

10. The apparatus as claimed in claim 1, wherein said block caster comprises two beam chains disposed upon two tracks.

11. The apparatus as claimed in claim 10, wherein said block caster comprises device for synchronizing movement of said beam chains along said tracks.

12. The apparatus as claimed in claim 11, wherein said device for synchronizing movement of said beam chains along said tracks comprises mechanical synchronization.

13. The apparatus as claimed in claim 10, wherein said block caster comprises two motors.

14. The apparatus as claimed in claim 13, wherein said block caster comprises device for synchronizing movement of said beam chains along said tracks.

15. The apparatus as claimed in claim 14, wherein said device for synchronizing movement of said beam chains along said tracks comprises electrical synchronization.

16. The apparatus as claimed in claim 1, wherein said motor is connected to said worm gear using at least one universal gear and a shaft.

17. The apparatus as claimed in claim 1, wherein said beam chain comprises interlinked support beams.

18. The apparatus as claimed in claim 17, wherein said device for meshing said beam chain with said worm gear comprises pivot rollers mounted on said support beams.

19. The apparatus as claimed in claim 1, wherein said worm gear comprises a cylindrical shaft having helical channels machined along the longitudinal axis of said shaft.

20. The apparatus as claimed in claim 19, wherein said shaft is disposed in close proximity to said beam chain.

21. The apparatus as claimed in claim 19, wherein said shaft is capable of being rotated about the longitudinal axis of said shaft by said motor.

22. The apparatus as claimed in claim 19, wherein said device for meshing said beam chain with said worm gear comprises pivot rollers mounted on said support beams.

23. The apparatus as claimed in claim 22, wherein said pivot rollers are capable of being engaged by said helical channels of said shaft.

24. An apparatus for driving a beam chain along a track in a continuous block caster, the beam chain supporting a cast slab and having at least one variation in beam pitch along a length of the beam chain from heating of a beam in the beam chain by the cast slab, comprising:

(a) a motor;

(b) a worm gear connected to said motor, said worm gear disposed next to said beam chain; and, (c) device for meshing said beam chain with said worm gear;

wherein said worm gear comprises a cylindrical shaft having helical channels along the length of said shaft thereby forming a thread, and wherein said motor is capable of energizing said worm gear such that said helical channels are capable of receiving said device for meshing said beam chain with said worm gear when said device for meshing reaches an inlet section of said worm gear to cause said beam chain to move and axially push said device for meshing toward an outlet section of said worm gear; and, wherein the thread pitch of said inlet section initially is about one theoretical beam pitch plus a first correction factor, the first correction factor being related to the at least one variation in beam pitch.

25. A worm gear for driving a beam chain along a track in a continuous block caster, the beam chain including a plurality of beams for supporting a cast slab, the beam chain having at least one variation in beam pitch due to heating of at least some of the beams by the cast slab, the worm gear comprising a cylindrical shaft having helical channels along the length of said shaft thereby forming a thread, wherein said helical channels are capable of receiving a device for meshing said beam chain with said worm gear when said device for meshing reaches an inlet section of said worm gear and axially pushing said device for meshing toward an outlet section of said worm gear;

wherein said thread pitch of said outlet section initially is about one theoretical beam pitch, said thread pitch in said outlet section changing to about one theoretical beam pitch minus a correction factor, the correction factor being related to the at least one variation in beam pitch.

26. The worm gear of claim 25, wherein the correction factor is related to at least a first beam pitch variation in a first length of beam chain adjacent to the outlet section; wherein the thread pitch of said inlet section initially is about one theoretical beam pitch plus a first correction factor, said thread pitch in said inlet section gradually decreasing at a substantially constant rate to about one theoretical beam pitch over a first longitudinal distance; wherein the first correction factor is related to at least a second beam pitch variation in a second length of beam chain adjacent to the inlet section; wherein the thread pitch of a substantially constant section of the worm gear initially is about one theoretical beam pitch, said thread pitch of the substantially constant section remaining substantially constant over a second longitudinal distance; wherein the substantially constant section is located between the input and output sections of the worm gear; and wherein said first correction factor is from about 0.1 mm to about 0.5 mm.

27. The worm gear of claim 26, wherein said first correction factor is from about 0.2 mm to about 0.4 mm.

28. The worm gear of claim 26, wherein said first correction factor is about 0.3 mm.

29. The worm gear of claim 26, wherein said second correction factor is from about 0.1 mm to about 0.5 mm.

30. The worm gear of claim 26, wherein said second correction factor is from about 0.2 mm to about 0.4 mm.

31. The worm gear of claim 26, wherein said second correction factor is about 0.3 mm.

32. The worm gear of claim 26, wherein said first longitudinal distance is approximately one theoretical beam pitch plus said first correction factor.

33. The worm gear of claim 26, wherein said second longitudinal distance is from about 1 to about 1.5 theoretical beam pitches.

34. The worm gear of claim 26, wherein said second longitudinal distance is approximately 1.25 theoretical beam pitches.

35. The worm gear of claim 26, wherein said third longitudinal distance is approximately one theoretical beam pitch minus said second correction factor.

36. The worm gear of claim 26, wherein said thread pitch in said inlet section compensates for variations in individual beam pitch which are greater than one theoretical beam pitch.

37. The worm gear of claim 26, wherein said thread pitch in said outlet section compensates for variations in individual beam pitch which are smaller than one theoretical beam pitch.

38. The worm gear of claim 26, wherein said worm gear is capable of engaging at least two beams in a beam chain at one time.

39. The worm gear of claim 26, wherein said worm gear is capable of engaging at least three beams in a beam chain at one time.

40. The worm gear of claim 26, wherein the total length of said worm gear along the longitudinal axis of said worm gear is equivalent to from at least about 3 to at least about 3.5 theoretical beam pitches.

41. The worm gear of claim 26, wherein the total length of said worm gear along the longitudinal axis of said worm gear is equivalent to at least about 3.25 theoretical beam pitches.

42. The worm gear of claim 26, wherein said worm gear moves said beam chain in the casting direction.

43. The worm gear of claim 26, wherein said worm gear moves said beam chain in a direction opposite to the casting direction.

44. The worm gear of claim 26, wherein said worm gear is connected to a motor.

45. The worm gear of claim 44, wherein said cylindrical shaft is capable of being rotated about the longitudinal axis of said shaft by said motor.

46. A worm gear for driving a beam chain along a track in a continuous block caster, the beam chain including a number of beams for supporting a cast slab, comprising a cylindrical shaft having helical channels along the length of said shaft thereby forming a thread, wherein said helical channels are capable of receiving a device for meshing said beam chain with said worm gear when said device for meshing reaches an inlet section of said worm gear and axially pushing said device for meshing through a substantially constant section of said worm gear toward an outlet section of said worm gear;

wherein the thread pitch of said inlet section initially is about one theoretical beam pitch plus a first correction factor, the first correction factor being related to at least one variation in beam pitch along a first length of the beam chain adjacent to the inlet section;

wherein the thread pitch of said substantially constant section initially is about one theoretical beam pitch; and, wherein said thread pitch of said outlet section initially is about one theoretical beam pitch, said thread pitch of said outlet section changing to about one theoretical beam pitch minus a second correction factor, the second correction factor being related to at least one variation in beam pitch along a second length of the beam chain adjacent to the outlet section.

47. A method for compensating for variation in individual beam pitch in a beam chain of a continuous block caster, the beam chain including a plurality of beams for supporting a cast slab, the cast slab heating adjacent beams in the beam chain and causing variations in beam pitch in the beam chain, comprising: contacting a device for meshing a beam chain with a worm gear comprising a cylindrical shaft having helical channels along the length of said shaft thereby forming a thread having a thread face, said thread having a thread pitch dependent upon a correction factor to compensate for at least one of the variations in beam pitch, the thread pitch being selected from the group consisting of: (a) beam pitches longer than one theoretical beam pitch; and (b) beam pitches shorter than one theoretical beam pitch.

48. The apparatus of claim 24, wherein the first correction factor ranges from about 0.1 mm to about 0.5 mm, wherein said thread pitch in said inlet section gradually decreases at a substantially constant rate to about one theoretical beam pitch over a first longitudinal distance of about one theoretical beam pitch; wherein the thread pitch of a substantially constant section of the worm gear initially is about one theoretical beam pitch, said thread pitch remaining substantially constant over a second longitudinal distance of from about 1 to about 1.5 theoretical beam pitches; wherein said thread pitch of said outlet section initially is about one theoretical beam pitch, said thread pitch in the outlet section gradually decreasing at a substantially constant rate to about one theoretical beam pitch minus a second correction factor of from about 0.1 mm to about 0.5 mm over a third longitudinal distance of about one theoretical beam pitch, and wherein the second correction factor is related to a second variation in beam pitch in the beam chain adjacent to the outlet section of said worm gear.

49. A worm gear for driving a beam chain along a track in a continuous block caster, the beam chain including a plurality of beams for supporting a cast slab, the cast slab imparting thermal variations to adjacent beams in the beam chain and said thermal variations causing variations in beam pitch in the beam chain, the worm gear comprising a cylindrical shaft having helical channels along the length of said shaft thereby forming a thread, wherein said worm gear comprises variations in thread pitch to at least substantially account for the variations in beam pitch caused by the transmitted thermal variations.

50. A method for compensating for thermal variations in individual beam pitch in a beam chain of a continuous block caster, the beam chain including a plurality of beams for supporting a cast slab, the cast slab causing thermal variations in the beam chain and said thermal variations causing variations in beam length in the beam chain, comprising providing a worm gear comprising: (a) a first section which increases or decreases a thread pitch in response to a first difference between the beam length and one theoretical beam pitch; (b) a second section having an at least substantially constant thread pitch; and, (c) a third section having a thread pitch which increases of decreases the thread pitch in response to a second difference between the beam length and one theoretical beam pitch, wherein the third section increases when the thread pitch of the first section decreases and decreases the thread pitch of the third section when the thread pitch of the first section increases and wherein said first and second differences are disparate.

51. The worm gear of claim 49, wherein said worm gear moves said beam chain in the casting direction.

52. The worm gear of claim 49, wherein said worm gear moves said beam chain in a direction opposite to the casting direction.

53. The worm gear of claim 49, wherein said worm gear is connected to a motor.

54. The worm gear of claim 49, wherein said worm gear is capable of engaging at least two beams in a beam chain at one time.

55. The worm gear of claim 49, wherein said worm gear is capable of engaging at least three beams in a beam chain at one time.

56. The worm gear of claim 46, wherein said first correction factor is from about 0.2 mm to about 0.4 mm.

57. The worm gear of claim 46, wherein said first correction factor is about 0.3 mm.

58. The worm gear of claim 46, wherein said second correction factor is from about 0.1 mm to about 0.5 mm.

59. The worm gear of claim 46, wherein said second correction factor is from about 0.2 mm to about 0.4 mm.

60. The worm gear of claim 46, wherein said second correction factor is about 0.3 mm.

61. The worm gear of claim 46, wherein said thread pitch in said inlet section compensates for variations in individual beam pitch which are greater than one theoretical beam pitch.

62. The worm gear of claim 46, wherein said thread pitch in said outlet section compensates for variations in individual beam pitch which are smaller than one theoretical beam pitch.

63. The worm gear of claim 46, wherein said worm gear is capable of engaging at least two beams in a beam chain at one time.

64. The worm gear of claim 46, wherein said worm gear is capable of engaging at least three beams in a beam chain at one time.

65. The worm gear of claim 46, wherein the total length of said worm gear along the longitudinal axis of said worm gear is equivalent to from at least about 3 to at least about 3.5 theoretical beam pitches.

66. The worm gear of claim 46, wherein the total length of said worm gear along the longitudinal axis of said worm gear is equivalent to at least about 3.25 theoretical beam pitches.

67. The worm gear of claim 46, wherein said worm gear moves said beam chain in the casting direction.

68. The worm gear of claim 46, wherein said worm gear moves said beam chain in a direction opposite to the casting direction.

69. The worm gear of claim 46, wherein said worm gear is connected to a motor.

* * * * *